(12) United States Patent
Kadambe et al.

(10) Patent No.: US 8,699,971 B1
(45) Date of Patent: Apr. 15, 2014

(54) SYSTEM FOR SPECIFIC EMITTER IDENTIFICATION

(71) Applicants: Shubha L. Kadambe, Cedar Rapids, IA (US); Jason A. Fuemmeler, Cedar Rapids, IA (US); Carlos J. Chavez, Marion, IA (US); William S. Spencer, Cedar Rapids, IA (US); Gina M. Reyes, Iowa City, IA (US); Robert J. Frank, Cedar Rapids, IA (US); Michael N. Newhouse, Marion, IA (US)

(72) Inventors: Shubha L. Kadambe, Cedar Rapids, IA (US); Jason A. Fuemmeler, Cedar Rapids, IA (US); Carlos J. Chavez, Marion, IA (US); William S. Spencer, Cedar Rapids, IA (US); Gina M. Reyes, Iowa City, IA (US); Robert J. Frank, Cedar Rapids, IA (US); Michael N. Newhouse, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 13/679,025

(22) Filed: Nov. 16, 2012

Related U.S. Application Data

(62) Division of application No. 12/891,624, filed on Sep. 27, 2010, now Pat. No. 8,326,240.

(51) Int. Cl.
*H04B 17/00* (2006.01)

(52) U.S. Cl.
USPC ..... 455/115.1; 455/500; 455/501; 455/114.2; 455/115.3

(58) Field of Classification Search
USPC ............. 455/500, 501, 63.1, 114.2, 67.11, 455/115.1, 115.3, 134, 226.1, 226.2, 296, 455/278.1
See application file for complete search history.

(56) References Cited

U.S. PATENT DOCUMENTS

2002/0150184 A1* 10/2002 Hafeez et al. ............... 375/346
2003/0092448 A1*  5/2003 Forstrom et al. ............ 455/456
2004/0027276 A1*  2/2004 Herman ....................... 342/181

* cited by examiner

*Primary Examiner* — Tuan Pham
(74) *Attorney, Agent, or Firm* — Donna P. Suchy; Daniel M. Barbieri

(57) ABSTRACT

An apparatus for identifying a specific emitter in the presence of noise and/or interference is disclosed. The apparatus includes a sensor configured to sense radio frequency signal data, the signal data containing noise and signal from at least one emitter, a reference estimation unit configured to estimate a reference signal relating to the signal transmitted by one emitter, a feature estimation unit configured to generate one or more estimates of one or more feature from the reference signal and the signal transmitted by that particular emitter, and an emitter identifier configured to identify the signal transmitted by that particular emitter as belonging to a specific device using one or more feature estimates. The emitter identifier identifies the signal transmitted by that particular emitter as belonging to a specific device using Gaussian Mixture Models and the Bayesian decision engine.

8 Claims, 29 Drawing Sheets

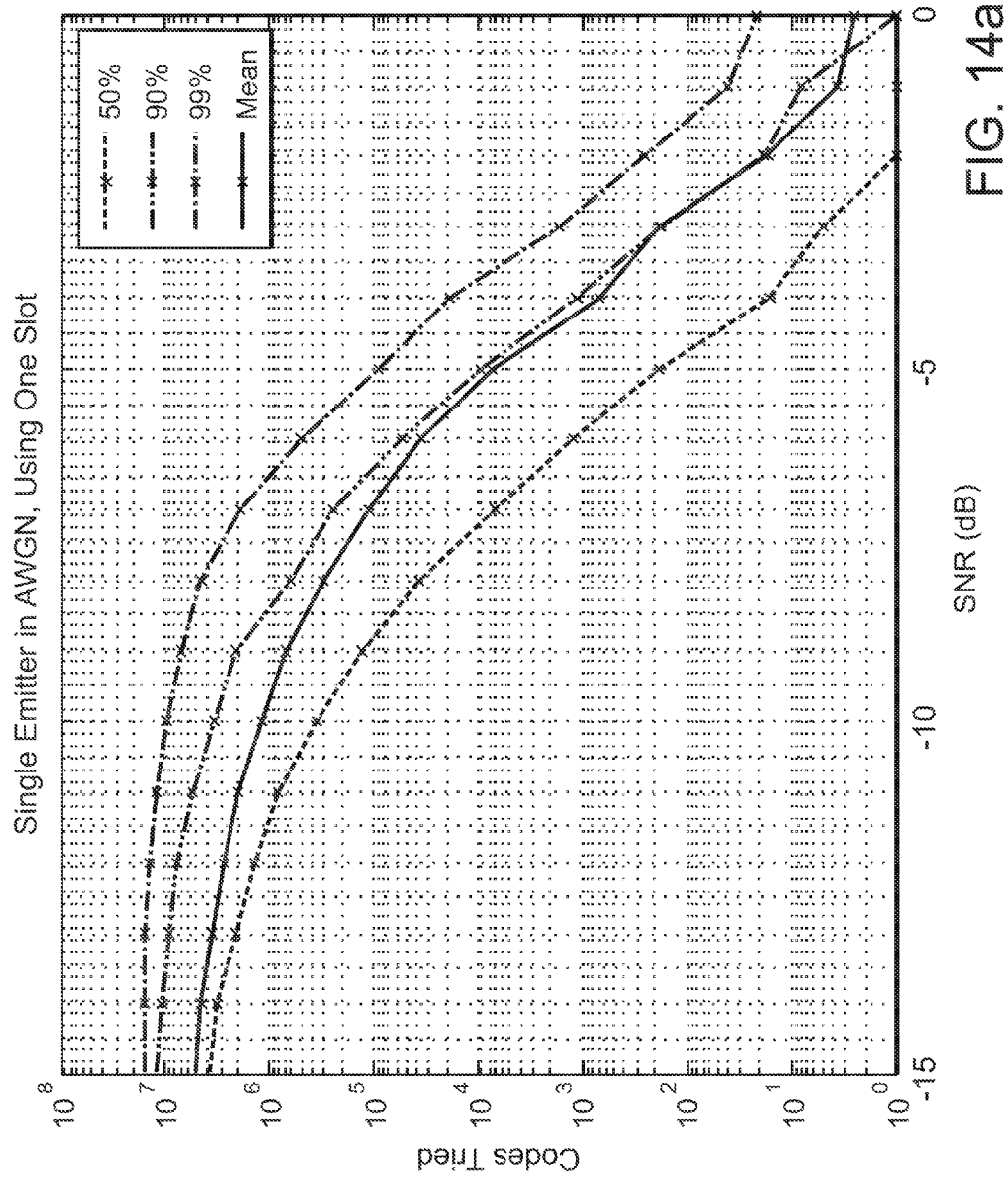

| Classifier decision \ True | A | B | C | D | E | BB | MR | Error rate |
|---|---|---|---|---|---|---|---|---|
| A | 36 | 0 | 0 | 2 | 1 | 0 | 0 | 0.0769 |
| B | 0 | 39 | 0 | 0 | 0 | 0 | 0 | 0 |
| C | 0 | 0 | 51 | 0 | 0 | 0 | 0 | 0 |
| D | 1 | 0 | 0 | 36 | 1 | 0 | 0 | 0.0526 |
| E | 0 | 0 | 0 | 1 | 38 | 0 | 0 | 0.0256 |
| BB | 0 | 0 | 0 | 0 | 0 | 39 | 0 | 0 |
| MR | 0 | 0 | 0 | 0 | 0 | 0 | 39 | 0 |

Average error rate = 0.0222

SYSTEM FOR SPECIFIC EMITTER IDENTIFICATION

RELATED APPLICATIONS

This present application claims the benefit under 35 U.S.C. 120 to U.S. patent application Ser. No. 12/891,624 filed Sep. 27, 2010, pending. Said U.S. patent application Ser. No. 12/891,624 is hereby incorporated by reference in its entirety.

This application is related to commonly assigned, non-provisional U.S. patent application Ser. No. 12/877,418, filed Sep. 8, 2010 and entitled "Cognitive Networked Electronic Warfare", and commonly assigned, non-provisional U.S. patent application Ser. No. 12/877,397, filed Sep. 8, 2010 and entitled "An Adaptive Second Order Threshold Calibration Technique for Radiometric Signal Detection", both of which are incorporated by reference herein.

U.S. patent application Ser. No. 12/891,588, entitled "Signal Separation and SINR Enhancement" listing as inventors Jason A. Fuemmeler, Carlos J. Chávez, Robert J. Frank, Shubha L. Kadambe, Michael N. Newhouse, Gina M. Reyes, and W. Sam Spencer, U.S. patent application Ser. No. 12/891,609, entitled "Reference-Based Radio Frequency Feature Estimation" listing as inventors Carlos J. Chávez, Robert J. Frank, Jason A. Fuemmeler, Shubha L. Kadambe, Michael N. Newhouse, Gina M. Reyes, and W. Sam Spencer, and U.S. patent application Ser. No. 12/891,638 entitled "Identifying a CDMA Scrambling Code" listing as inventors Jason A. Fuemmeler, Shubha L. Kadambe, and Gina M. Reyes, all of which are incorporated by reference herein.

BACKGROUND

Sensing the use of radio frequencies, identifying the users, and potentially jamming their future use are becoming increasingly important in many fields. Such Radio Frequency (RF) sensing and jamming techniques are being used in military applications, law enforcement, and commercial applications. Military applications include Electronic Warfare (EW), such as (a) Electronic Situation Awareness (ESA) (e.g., mapping all the RF signals present in a given region), (b) Electronic Attack (EA) (e.g., (i) deactivation of IEDs and (ii) jamming enemy communications), and (c) Electronic Protection (EP) (e.g., identifying friendly communication being jammed and protecting it from being jammed by changing the frequency). Just RF sensing alone can also be used for many military applications, such as eavesdropping on enemy communication, Signal Intelligence (SIGINT) and Communication Intelligence (COMINT). Law enforcement applications may include disrupting communications of criminals in drug raids and terrorists, and dealing with hostage situations. Commercial applications may include prevention of corporate espionage.

Several systems have been developed for RF EW and some commercial products are available. These systems are based on energy detectors, maximum likelihood based classifiers, and a signal generator that jams the identified source. However, conventional systems are unable to automatically adapt to the environmental conditions, cannot handle signals that are unknown to the system, and are developed for the detection and classification of only certain broad classes of RF signals. Furthermore, conventional systems often have limited adaptation capability, which if available, is typically handled by manual adjustment. These systems are able to collect data when they encounter signals that the system is not trained for. However, such data is unusable until the systems are retrained in the laboratory and redeployed. Such a process takes months. By then new signals/threats may appear in the field of operations.

SUMMARY

In view of the foregoing, the following disclosure presents an apparatus and techniques for Specific Emitter Identification. Specific Emitter Identification (SEI) denotes a technology that can recognize individual electronic emitters through externally observable criteria, i.e. parameters and/or characteristics of the transmission. Such a technology provides reliable and timely intelligence data for keeping track of individual target emitters, as well as the particular units or individuals operating them. This capability is very much needed in Signal Intelligence (SIGINT) and/or Electronic Warfare (EW) military operations. This disclosure addresses that need.

In short, the approach is three pronged—(1) enhance the signal quality by subtracting interferers, (2) estimate scrambling code (for a CDMA-based signal), demodulate the signal, and remodulate the signal to generate the reference signal, and (3) extract features and identify specific emitters using the generated reference signal. Experimental datasets were collected from seven different emitters (commercially-available mobile phones) when they were transmitting either voice or data, and the resulting model was able to identify the individual emitters with 98% accuracy.

The following disclosure presents an apparatus for identifying a specific emitter in the presence of noise and/or interference. The apparatus includes a sensor configured to receive a portion of the radio frequency spectrum and produce complex data, the complex data containing noise and a signal from at least one emitter, a reference estimation unit configured to estimate a reference signal relating to the signal transmitted by one emitter, a feature estimation unit configured to generate one or more feature estimates from the reference signal and the signal transmitted by that particular emitter, and an emitter identifier configured to identify the signal transmitted by that particular emitter as belonging to a specific emitter by using the one or more feature estimates. The emitter identifier preferably identifies the signal transmitted by that particular emitter as belonging to a specific device or handset using Gaussian Mixture Models and the Bayesian decision engine. The apparatus may also include an SINR enhancement unit configured to enhance the SINR of one or more observations of one or more emitters in the complex data before the reference estimation unit estimates the reference signal.

BRIEF DESCRIPTION OF THE DRAWINGS

FIGS. 14a-c show a plot of the number of evaluations performed before the correct seed is found for a single emitter in additive white Gaussian noise.

FIG. 28 shows a table of SEI accuracy in the form of a confusion matrix for the feature vector dimension of six and three Gaussian mixtures.

DETAILED DESCRIPTION

CNEW System

Figure 1:
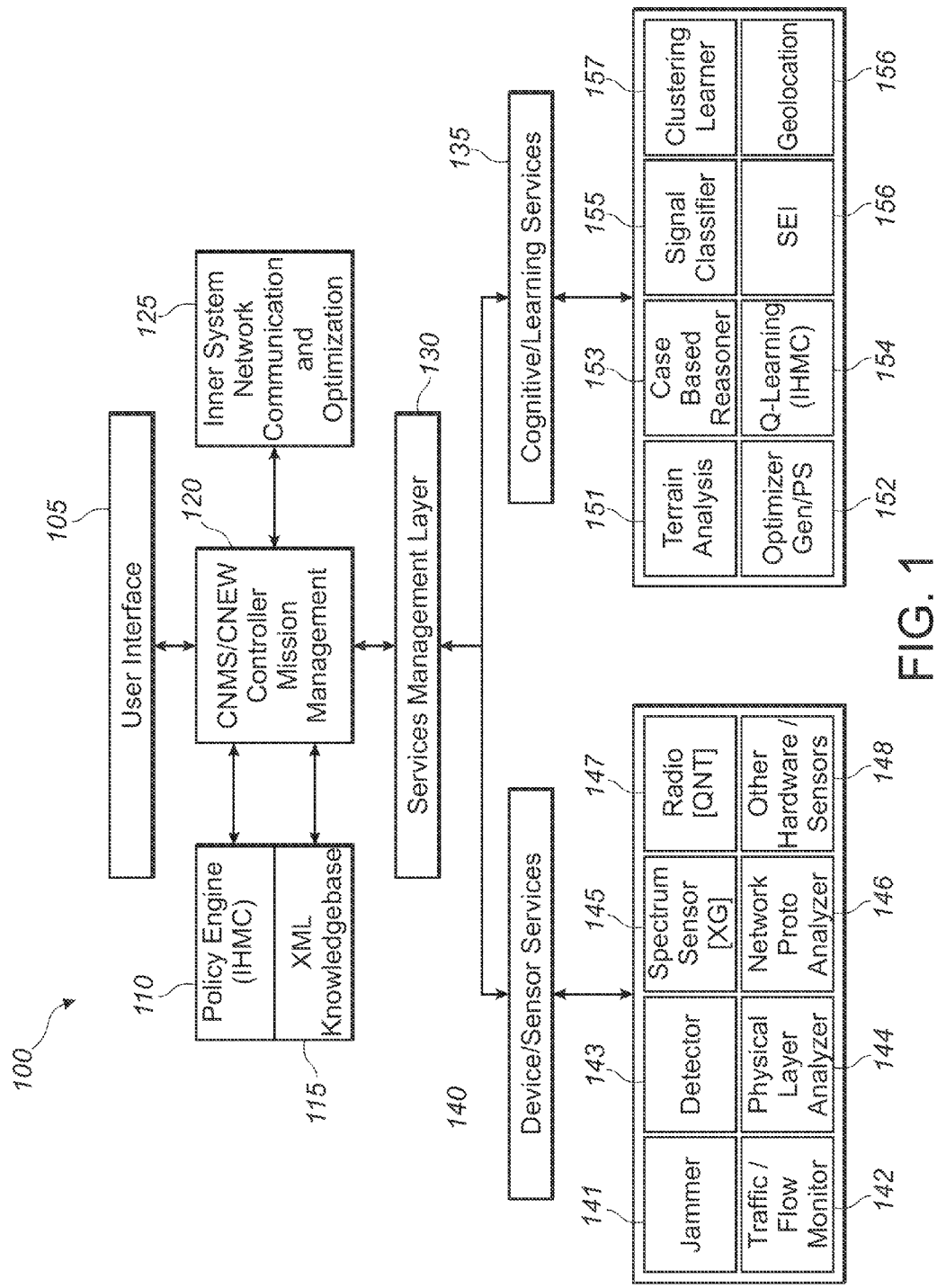
FIG. 1 shows a block diagram of the architecture of the disclosed CNEW system.

FIG. 1 shows a block diagram of the software-defined open architecture of the disclosed system. Preferably, each of the functional blocks shown in system 100 are implemented as software routines capable of running on a general purpose computer or radio/sensor hardware that has general purpose processors and is capable of controlling specific hardware (e.g., radio, jammer, RF sensor, spectrum analyzer, etc.) that will be described below. The disclosed CNEW system 100 is a service-oriented, event-driven system. In general, two types of services are provided—device/sensor-based services 140 and cognitive/learning-based services 135. These services are further divided into specific sub-services. For example, device/sensor-based services 140 may include a jammer 141, a detector 143, a spectrum sensor 145, a radio 147, a traffic/flow monitor 142, a physical layer analyzer 144, a network protocol analyzer 146, and other hardware/sensors 148. The cognitive/learning service 135 may include terrain analysis 151, a case-based reasoner 153, a signal classifier 155, a clustering learner 157, an optimizer 152, Q-learning module 154, specific emitter identification (SEI) module 156, and a geolocation module 158.

Based on the mission the system is performing, the service management layer 130 selects the needed services. For example, if the mission is ES, the spectrum sensor 145 and detector 143 from the device/sensor services 140 are selected, and the signal classifier 155, SEI module 156, geolocation module 158, clustering learner 157 and case-based reasoner 153 from cognitive/learning services 135 are selected, respectively. Then the Cognitive Network Manager System/Cognitive Networked Electronic Warfare (CNMS/CNEW) controller 120 schedules the spectrum sensor 145 to scan the RF environment. When the scanned data is available, the controller 120 assigns the detector 143 to detect whether any signals are present in the scanned data.

If signals are present, then the controller 120 activates the signal classifier 155 to identify the signal type. If the identified signal type is unknown to the system, the system collects the signal's cumulant-based features for later analysis. When enough unknown signals are collected, the controller 120 activates the clustering learner 157. If signal clusters are found, the controller 120 activates retraining of the signal classifier 155 and the signal clusters are used to retain the system in the field. In this way, signal types previously unknown to the system can be learned and become known signals without retraining the signal classifier offline.

While signals are being classified, the controller 120 may also activate geolocation module 158 to locate the position of the RF emitters. Once the signal type is determined, the controller 120 activates the SEI module 156. The SEI module is configured to identify the specific type of emitter that was classified. The SEI module may be configured to various levels of granularity. For example, the SEI module may be able to distinguish between certain brands of cell phones at one level granularity. and may be able to distinguish between specific individual cell phones at some higher level of granularity. Using these techniques and modules, signals present in the scanned area are detected, classified and geolocated.

RF sensing may be accomplished using a spectrum sensor 145 or a radio 147. Radio 147 may be a software-defined radio, such as a QNT radio, and spectrum sensor 145 may be a spectral sensor, such as an XG sensor. QNT radios and XG sensors have been developed by Rockwell Collins, Inc. of Cedar Rapids, Iowa under a DARPA program. Furthermore, a network of spectrum sensors or radios can be used and they can be spatially distributed in a given area. The advantage of using a network of sensors is that the detection accuracy can be improved by performing collaborative sensing, especially in fading and shadowing channels.

In addition, the location of an RF source can be determined if the signals received by three neighboring RF sensors are correlated and the locations of the sensor nodes are known. To know the locations of the sensor nodes, a GPS sensor can be included as part of the RF sensor. To know whether the signals received by the neighboring nodes are correlated, the correlation coefficient is computed at one of the sensors using three signals—two from its neighbors and one from itself. The correlation coefficient between signals X and Y with n measurements $x_i$ and $y_{i\ i=1,2\ldots n}$ is defined as:

$$r_{xy} = \frac{\sum_{i=1}^{n}(x_i - \bar{x})(y_i - \bar{y})}{(n-1)\sigma_x \sigma_y}$$

Here $\bar{x}$ and $\bar{y}$ are the mean of X and Y and $\sigma_x$ and $\sigma_y$ are the standard deviation of X and Y, respectively. If the correlation coefficient has a magnitude greater than some threshold, then they are correlated. The threshold is typically determined based on some allowable probability of false alarm. If the received signals are correlated, then the location of the RF source is estimated by the time difference of arrival, which can be computed by knowing the differences in time at which the signal was received by three different sensors. Moreover, if the sensors are on mobile platforms, they can be strategically placed based on output from the terrain analysis module 151. For this, terrain data (DTED, road maps, environment) and policy engine 110 are used. Using the terrain data, the terrain type (e.g., mountainous, foliage) and occlusions (e.g., a hill between a jammer and the enemy node) are determined by the terrain analyzer. Based on the occlusions the policy engine determines what actions to take (e.g., suggest a placement for jammer node so that the hill is not between the jammer node and the enemy node and a direct line of sight link can be established).

Detector 143 is a signal detector, and is preferably implemented as a radiometer-based detector. The detectors threshold value (between noise, and signal plus noise) is adaptively varied based on the first order, or first order and second order statistics of the background noise.

Detecting the presence of an unknown signal can be a difficult task, especially in the presence of noise and/or interference, each of which may or may not be known, and may also vary with time. In such an environment, a radiometer is perhaps the most basic approach to signal detection. Essentially, a radiometer measures the total power in a given spectrum over a period of time (where the spectrum can be considered either as a whole—a "single channel" radiometer, or as a set of smaller pieces to be treated separately—a "multichannel" radiometer), and looks for anything "abnormally" large. However, the challenge becomes defining what constitutes "abnormal". Setting such a threshold too low causes too many "false alarms"—instances where the detector claims the existence of a signal when there is not one actually present, while setting the threshold too high causes the detector to more frequently miss signals that are actually present. Except under highly idealized circumstances, it is difficult to simultaneously prevent both types of errors, and making too much of an effort to fight either type usually comes with a steep price in terms of the other. Accordingly, what is usually desired is some sort of "reasonable" compromise, often taking the form of a wish to minimize the number of missed signals subject to a specified maximum rate of false alarms.

Figure 2A:
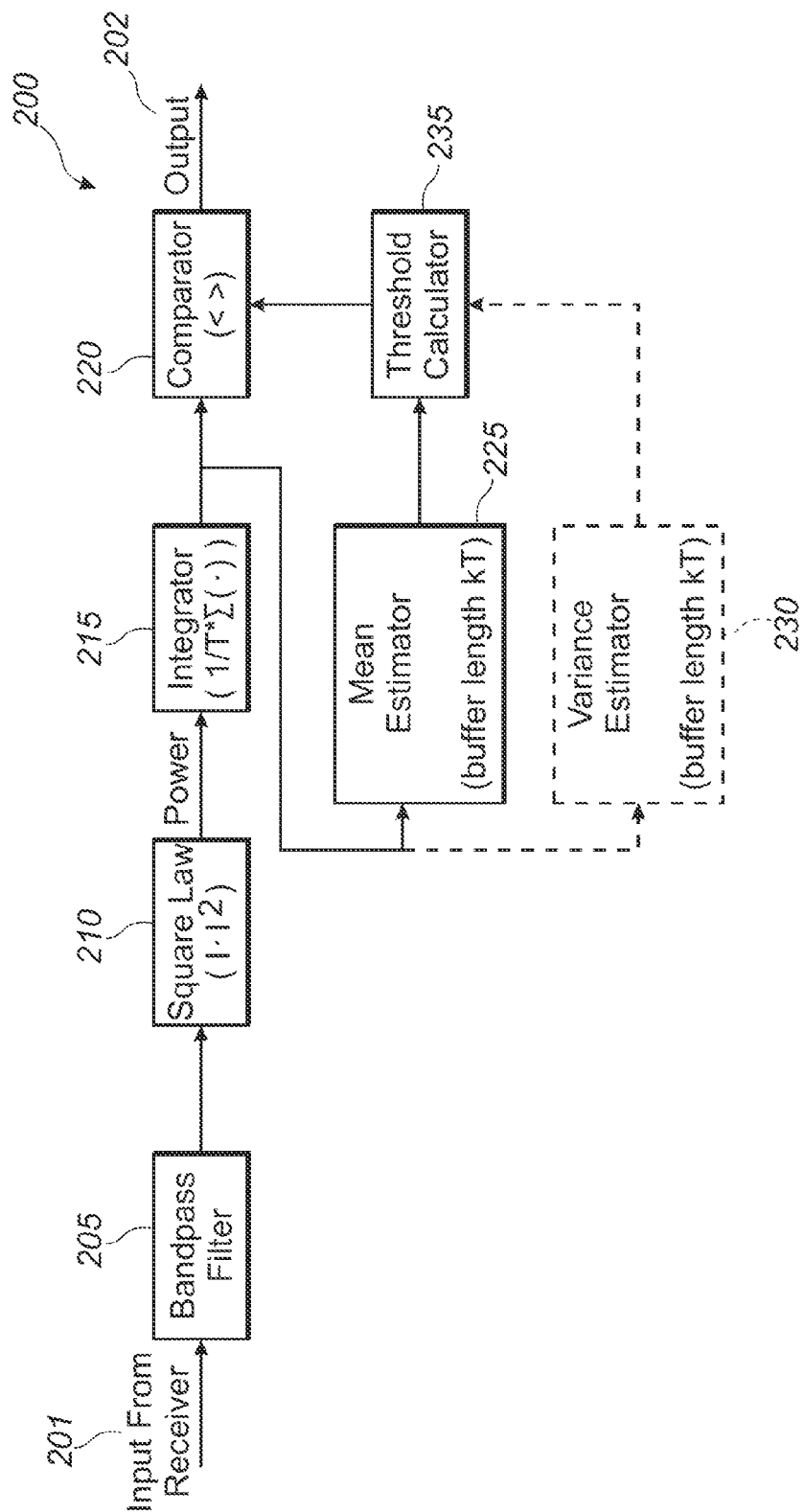
FIG. 2a shows a block diagram of a detection algorithm according to one embodiment of the disclosure.

FIG. 2a illustrates the basic operation of a radiometric signal detector. First, input signal 201 is received by a radio, such as an XG sensor, and filtered by a bandpass filter (or equivalent lowpass filter at baseband) 205. Next, the squared magnitude of the bandpass-filtered data is computed at square law block 210. This corresponds to the power of the bandpass-filtered input data. Next, the power is integrated over a certain period of time at integrator 215. This integration time period is a user selectable parameter. Finally, this integrated energy/power is compared against a threshold value at comparator 220. If the energy/power is greater than the threshold, then it is hypothesized that the received data contains a signal. If it is not greater than the threshold, then it is hypothesized that the received signal contains noise only.

If the distribution of the noise and/or interference is known, a detailed statistical model can be used to set a threshold that satisfies the false alarm criterion. Otherwise, one might make one or more simplifying assumptions. Frequently, it may be assumed that the signal impairment consists of additive white Gaussian noise with a fixed power level. In that case, then for a single channel radiometer, the noise at the output of the integrator should follow a chi-square distribution of order twice the length of the integrator. Such a distribution is defined by a single parameter—usually the mean. By measuring the mean of the integrator output over a period of k integration times, one can define the threshold as a multiple of that mean, with the coefficient being calculated from the order of the chi-square distribution and the false alarm rate tolerated (increased false alarm tolerance means a smaller threshold, which reduces missed signals and effectively lowers the minimum SNR needed to attain any given level of detection performance one cares to define as "satisfactory"). This is the structure shown with solid lines in FIG. 2a.

However, this simplified case may not hold in practice. For example, it may be that the noise, while being white and Gaussian, may have time-varying power. Alternatively, the "noise" may be due to an interfering communicator, and thus may not be Gaussian or white, but might have the structure of a modulated signal. In either case, the mean estimate may no longer provide sufficient information for modeling the impairment and controlling the false alarm rate. Accordingly, one can introduce a variance estimator as well, which also analyzes the previous k integrator outputs. This information can be used to calculate the standard deviation of the integrator outputs, allowing the use of a more complex statistical model for the threshold calculation.

Returning to FIG. 2a, mean estimator 226 and variance estimator 230 are used to estimate the mean and variance to set the threshold. The threshold value is set based on the estimated mean and variance at threshold calculator 235 using the following equations (note that the standard deviation used below is the square root of the variance).

$$\text{Threshold}_{Mean} = a * \text{Mean}_{Measured},$$

$$\text{Threshold}_{MeanVar} = \text{Mean}_{Measured} + b * \text{StandardDeviation}_{Measured}$$

Empirically, for the model described above, a reasonable choice for b can be made by finding the value for a in the first definition according to the integrator length and false alarm tolerance, and equating the two expressions under "ideal" circumstances (that is, choosing the value of b such that the two expressions agree when the mean and standard deviation are related in the way the theory predicts). Subsequently, the value of b can be tweaked somewhat if desired by examining test cases with types of signal impairment similar to what is expected in practice. There may still be some variation in the false alarm rate (which is to be expected, since it is difficult to come up with a thresholding scheme that maintains a given false alarm rate under all possible noise patterns), but by making slightly conservative choices, one can keep the false alarm rate below the acceptable limit under a wide variety of conditions.

Testing has shown this approach to be effective in providing increased signal detection performance in the presence of an interferer over a mean-based threshold rule, and is able to provide moderate performance while maintaining acceptable false alarm rates in varying noise environments in which a mean-based threshold rule incurs terribly high false alarm rates.

Significantly, this method performs noticeably better against an impairment consisting of both constant envelope interference and additive white Gaussian noise than against an impairment of equal total power consisting entirely of additive white Gaussian noise. This suggests that, at least in this case, it is able to implicitly capture and exploit certain characteristics of the interferer to improve detection performance over naively considering all forms of "noise" as identical.

The methods described above are defined in terms of the mean, or mean and variance, of the integrated noise power. However, by simply using the output of the integrator directly, the algorithm is actually using the properties of the received data stream, which consists of a mixture of both signals and noise, rather than those of just the noise itself. On their own, these methods assume that the statistical properties of that mixture can be used as a reasonable proxy for those of the noise—an assumption whose validity (and consequences) may vary in different scenarios.

The approach to remedy this problem is to attempt to refine the model so that only noise data is used to calculate the desired properties. One method of doing so would be to consider the output of the detector itself—since samples that exceed the threshold are considered to contain signals, the detector could choose to exclude such samples from the pool from which the sample statistics are estimated.

While this appears to be a clever approach, its self-validating nature introduces a potential flaw. In an environment where the noise level increases, it is possible that some or all of the new, more powerful noise samples will exceed the detection threshold when integrated, yielding false alarms. Under the old arrangement, these samples would then become part of the noise model, and therefore the estimated statistics would gradually shift to reflect the new noise properties. However, with the proposed modification, the detector would (incorrectly) label these samples as containing signals, and thus exclude them from the noise model. Accordingly, the noise model will not adapt to reflect the new noise properties, so the stream of false alarms is likely to continue, violating the false alarm constraint which the detector was designed to satisfy above all else.

Figure 2B:
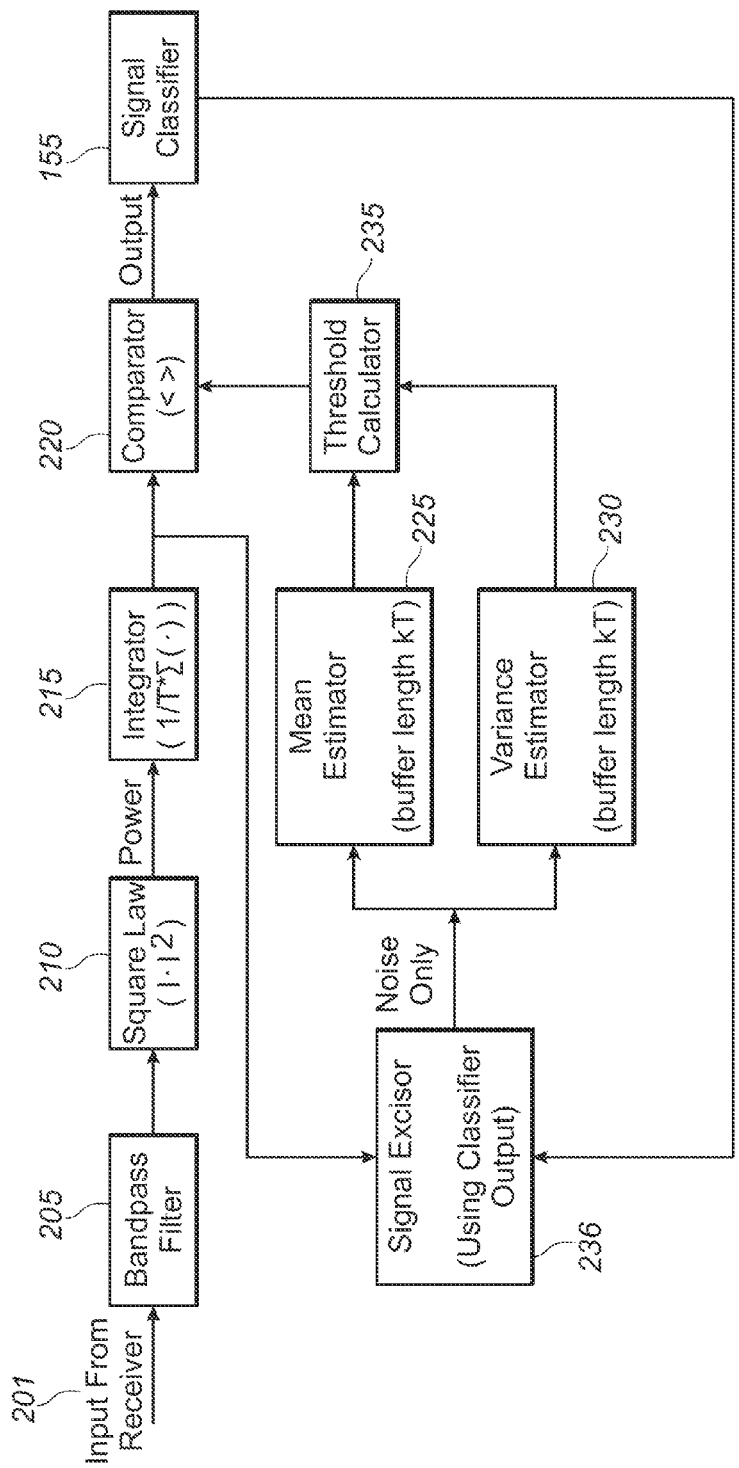
FIG. 2b shows a block diagram of a detection algorithm using the signal classifier in the threshold feedback according to another embodiment of the disclosure.

In order to refine the noise model without introducing this potential for "self-deception", it is useful to find an external means for validating the determination that a sample does, in fact, contain a signal, and should thus be excluded from the noise model. Fortunately, the classifier 155 provides just such a mechanism. FIG. 2b shows a block diagram of a detection algorithm using the signal classifier in the threshold feedback according to another embodiment of the disclosure. Samples that the detector identifies as signals are sent to the classifier 155, which identifies them as belonging to one of a set of known signal classes, as signals of an unknown class, or as noise. The classifier's determination of whether the samples are indeed signals or noise can then be fed back into the detector at signal excisor 236, which can then exclude them or include them in the noise model, accordingly. As shown in FIG. 2b, signal excisor 236 is configured to only pass the integrated power signal through to mean estimator 225 and variance estimator 230 if signal classifier 155 has classified the output of the detector as noise only. Since the classifier relies on cumulant-based features (to be described subsequently) rather than integrated power per se, it is able to distinguish between high-powered noise samples and actual signals in a way that the radiometric detector simply cannot.

In this way, the detector is able to use classifier feedback to improve the quality of the noise model, and thus choose a threshold that provides improved performance while robustly satisfying the designed false alarm rate limit.

Figure 3:
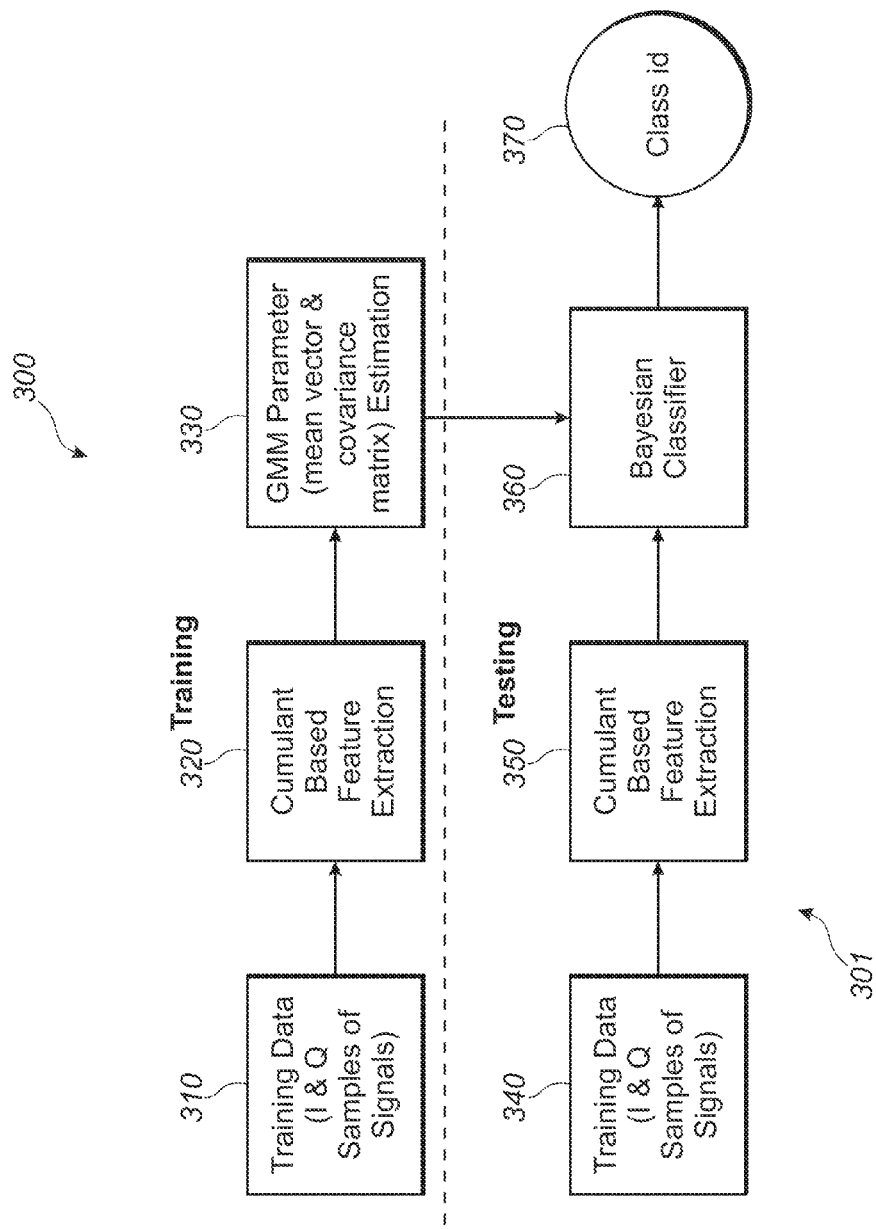
FIG. 3 shows block diagram of a classification algorithm according to one embodiment of the disclosure.

Returning to FIG. 1, signal classifier 155 identifies the type of the detected signal(s) using their baseband I/Q samples as input. The block diagram of the signal classifier is provided in FIG. 3. FIG. 3 shows that the classifier has two phases—training 300 and testing 301. During training, several instances of signals of interest 310 are considered. First, cumulant-based features 320 are extracted. Specific techniques for feature extraction will be discussed in more detail below. Next, a Gaussian Mixture Model (GMM) 330 is fitted to these feature vectors. GMM techniques will also be discussed in more detail below. These GMMs are stored in memory. During the testing phase 301, first cumulant-based features 350 are extracted (similar to the training phase) from the detected signal 340. Then the GMM that is closest to the extracted feature vector is determined using a Bayesian decision approach 360. This relates to computing the likelihoods or probabilities and selecting the one with the maximum likelihood. The signal label associated with the GMM that produced the maximum likelihood is assigned as the type 370 (class id) of the detected signal.

Figure 4:
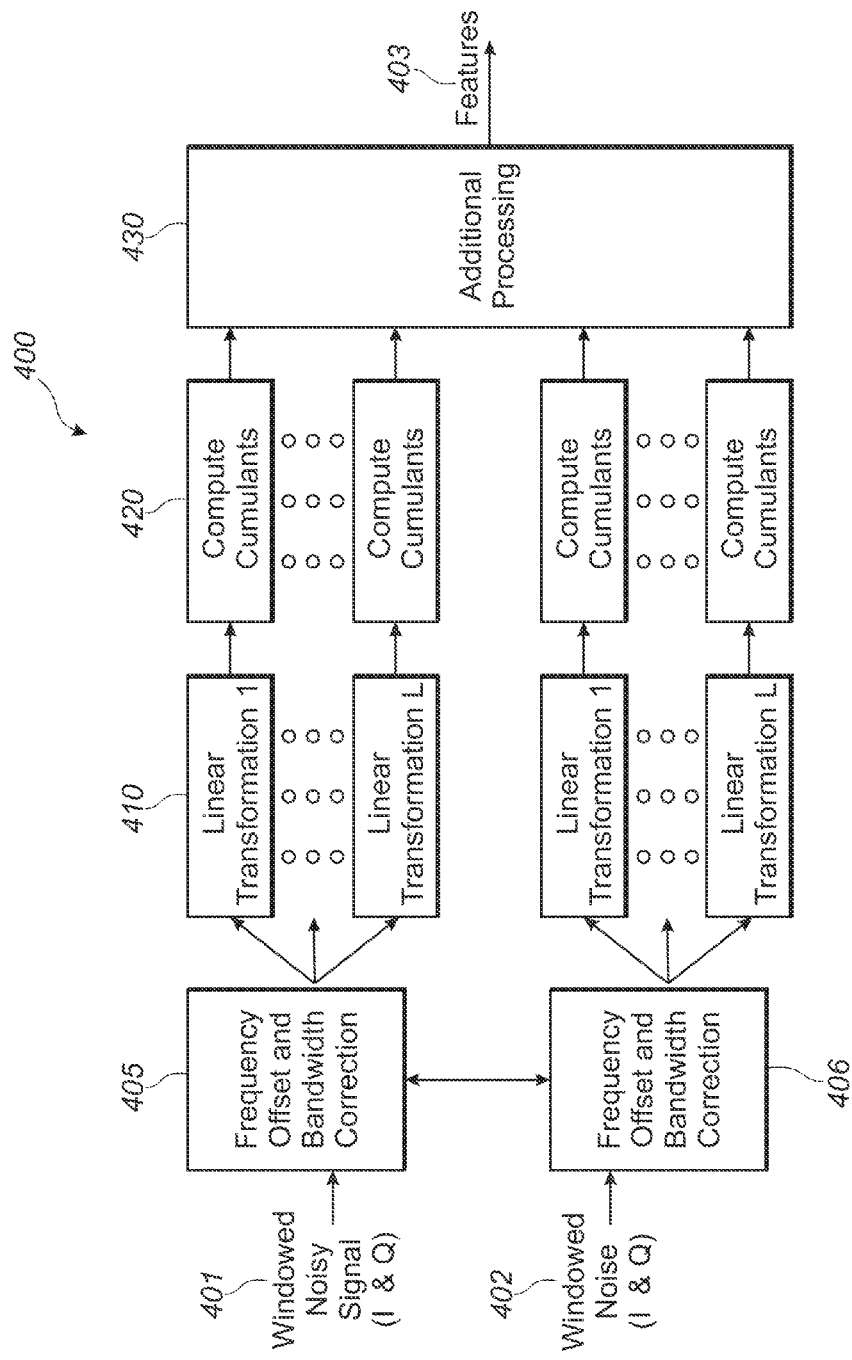
FIG. 4 shows a block diagram of a technique of cumulant feature extraction according to one embodiment of the disclosure.

The block diagram of the technique used to extract cumulant-based features is shown in FIG. 4. Frequency Offset and Bandwidth Correction 405 and 406 are configured to compute the Doppler or "center of gravity" of the power spectrum of the incoming noisy signals. The incoming noisy signals includes both the windowed noisy signal 401 and windowed noise 402. The windowed noisy signal contains signal plus noise where as windowed noise contains only noise. Before computing the "center of gravity" of the signal, the average power spectrum of the noise is subtracted off so as to not introduce bias. The bandwidth of the signal is estimated by finding the bandwidth around the Doppler frequency that contains approximately 90% of the signal (not noise) power. Due to noise, there may be multiple bandwidths that fit this requirement so an average of all solutions is taken. The frequency offset i.e., the Doppler is corrected by multiplying the noisy signal by a complex exponential. The bandwidth is corrected by resampling so that the 90% bandwidth takes up approximately ½ the frequency domain.

Once the Doppler frequency is computed and the bandwidth corrected, multiple linear transformations 410 are performed side-by-side. In one preferred embodiment, four different linear transformations are applied. The four transformations are (1) Identity (i.e., do nothing to the signal), (2) Apply a Low Pass Filter (LPF) using the filter coefficients [1 1 1 1], (2) Apply a High Pass Filter (HPF) using the filter coefficients [1 −1 1 -1], and (4) apply a Bandpass Filter using the filter coefficients [1 1-1-1]. These filters are used because of ease of implementation in hardware.

Figure 5:
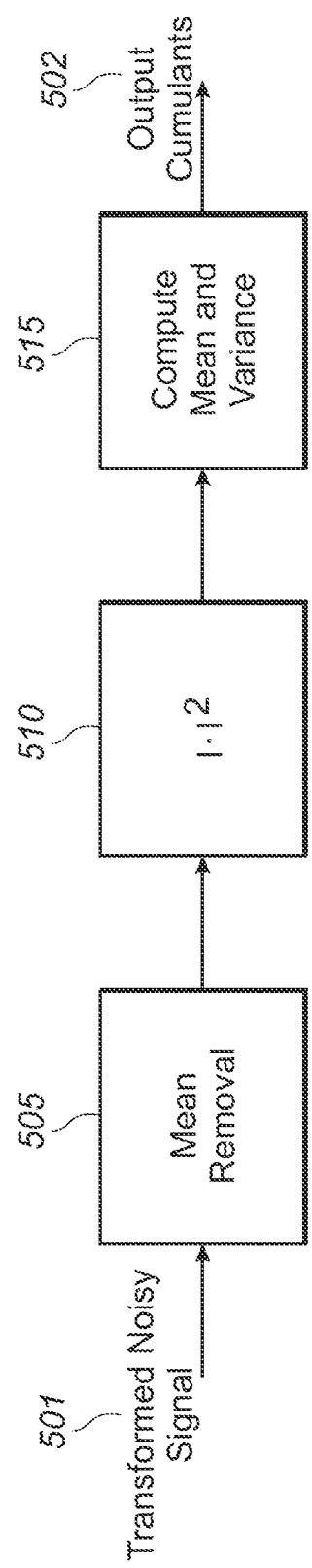
FIG. 5 shows a block diagram of the additional processing block of the cumulant feature extraction technique according to one embodiment of the disclosure.

After the linear transformations are complete, the cumulants of each transformation output are computed. As with the linear transformations, there are preferably four compute cumulant blocks 420. The first and second cumulants (mean and variance) are computed using the approach shown in FIG. 5. First, a mean removal block 505 removes the mean of the incoming linearly transformed noisy signal 501. Next, block 510 computes the magnitude square of the signal and finally block 515 computes mean and variance of the transformed noisy signal output cumulants 502. The mean is removed to make the expressions for the cumulants of the signal plus noise simpler. Since a nonzero mean at complex baseband implies the presence of an unmodulated carrier, little information is lost in doing this. The signal is magnitude squared to eliminate the dependence on the unknown carrier phase.

Returning to FIG. 4, Additional Processing block 403 carries out the following processing: Let X be the signal of interest and N be the noise. Since mean of these signals are removed, each can be considered to be zero mean. It can be shown that $$E[(X+N)(X+N)^*]=E[XX^*]+E[NN^*]$$

and $$\text{Var}[(X+N)(X+N)^*]=\text{Var}[XX^*]+\text{Var}[NN^*]+2E[XX^*]E[NN^*]$$

The expressions would be more complicated if X and N were nonzero mean. The usefulness of these equations is that if we know the cumulants of the noise and the cumulants of the signal plus noise, we can compute the cumulants of the signal alone. This is the first step in what we have termed "Additional Processing."

The second step of Additional Processing 403 is to eliminate the effect of the signal amplitude. Suppose A is the signal amplitude (gain) that was applied in signal generation. Then $E[XX^*]$ is proportional to $A^2$ and $\text{Var}[XX^*]$ is proportional to $A^4$. Let $\mu_i = E[XX^*]$ for the $i^{th}$ linear transformation for i=1,2,3,4 mentioned above. Similarly let $\sigma^2_i$ be $\text{Var}[XX^*]$ for the $i^{th}$ linear transformation for i=1,2,3,4. Using these, compute the following features:

$$f_1 = \frac{\sigma_1^2}{\mu_1^2}$$

$$f_2 = \frac{\sigma_2}{\mu_1}$$

$$f_3 = \frac{\sigma_2^2}{\mu_1^2}$$

$$f_4 = \frac{\sigma_3}{\mu_1}$$

$$f_5 = \frac{\sigma_3^2}{\mu_1^2}$$

$$f_6 = \frac{\sigma_4}{\mu_1}$$

$$f_7 = \frac{\sigma_4^2}{\mu_1^2}$$

This retains the maximum amount of information from the statistics while eliminating the dependence on A. It is difficult to compute the cumulant features 403 exactly and thus there will be error introduced in the above manipulations. However, with sufficient sample size this error can be kept to a minimum. One way this error manifests itself is that the values of the computed $\sigma^2_i$ can have negative values when the effects of noise are subtracted. If this happens, a value of zero is used instead.

Returning to FIG. 1, during the training phase as mentioned above, signal classifier 155 utilizes GMMs and they are fit to the extracted cumulant-based features. Fitting a GMM corresponds to estimating the mean vectors and covariance matrices for the selected number of Gaussian mixtures. For this estimation, the Expectation-Maximization algorithm is used. For this algorithm, the inputs are: Data (x)—features, the number of mixtures/model (M), and the number of classes (C), and the outputs from this algorithm are: a total of C Mean Vectors ($\mu$) of length M, and a total of C Covariance Matrices ($\Sigma$) of size M×M. The multivariate normal distribution (GMM) that fits the feature for each class is given by:

$$p\left(x, \{\mu_i, \sum_i\}\right) \sqrt{\frac{1}{(2\pi)^F \det(\Sigma_i)}} e^{-\frac{1}{2}(x-\mu_i)^T \Sigma_i^{-1}(x-\mu_i)}$$

where F is the number of features ($f_1$-$f_5$ or $f_1$-$f_7$ in our example). Hence, the likelihood (probability of data given a classification h) is:

$$p(x|h) = \sum_{i=1}^{C} p\left(x, \{\mu_i, \sum_i\}\right)$$

During training phase these GMMs are computed and stored in memory for each class of signal.

Returning to FIG. 3, during deployment (which is referred to as the testing phase 301), the sampled version of the detected signal 340 is input to the classifier. The classifier first computes the cumulant features described above. It then applies the Bayesian decision process 360 to determine the class or type of the detected signal. The Bayesian decision process is as follows. Let C be the number of classes. A Bayesian classifier is a statistical classifier which utilizes Bayes' rule to make the classification decision:

$$p(h|x) = \frac{p(x|h)p(h)}{p(x)}$$

where h is a class label, x is the data-feature vector. Each class is equally likely, hence:

$$p(h) = \frac{1}{C}$$

p(x) in the above equation can be approximated as:

$$p(x) = \sum_{i=1}^{C} p(x|h_i)p(h_i)$$

Then the classification decision is: Pick a class with the largest p(h|x)

The signal classifier is an open set classifier, in that if the signal it is trying to classify is not in its database or library (i.e., the classifier is not trained for that particular signal), it classifies it as "unknown" instead of associating it with one of the classes it is trained for. For this unknown class determination, we use a distance measure based on Bhattacharya to compare the probability distributions. This distance is defined as follows:

$$\text{dist}(A, B) = \sum_{i=1}^{M_A} W_{A_i}\left[\sum_{j=1}^{M_B} W_{B_j} d_B(p_{A_i}, p_{B_j})\right] d_B(p_{A_i}, p_{B_j}) =$$

$$\frac{1}{8}(m_{A_i} - m_{B_j})\Sigma^{-1}(m_{A_i} - m_{B_j}) + \frac{1}{2}\ln\left(\frac{\det\frac{\Sigma_{A_{ij}} + \Sigma_{B_j}}{2}}{\sqrt{\det \Sigma_{A_{ij}} * \det\Sigma_{B_j}}}\right)$$

where $p_{A_i}$ is $N(m_{A_i}, \Sigma_{A_i})$

Here $W_{Ai}$ is the ith component weight of GMM of class A and $W_{Bj}$ is the jth component weight of GMM of class B.

Noise is considered as one of the classes in our classifier. It is possible that what is being observed can easily be mistaken for noise instead of a new unknown class of signal. To overcome this problem, we calculate:

$$p(\text{newclass} \wedge \overline{\text{noise}})$$

If the two events are independent then $$p(n_c \wedge \overline{\text{noise}}) = p(n_c)p(\overline{\text{noise}}) = p(n_c)[1 - p(\text{noise})]$$

$$p(\text{noise}) = p(\text{noise}_0)p(\text{noise}_1)\ldots p(\text{noise}_N)$$

where $n_c$ is new class $$p(n_c) = \begin{cases} -\frac{1}{T}\max(d(\text{class}_i, \text{new})) + 1 & \max(\text{dist}(\text{class}_i, \text{new})) \leq T \\ 0 & \text{otherwise} \end{cases}$$

Here T is the set threshold of the Bhattacharya metric.

The above described classifier is also trained for noise by considering it as one of the classes mentioned above. If the detected signal is classified as noise, then feedback to the detector 143 is provided indicating that this may be a false alarm. The detector then uses that information to include those samples in the noise model, rather than excising them as a signal. By doing so, the detector is better able to adhere to the target false alarm rate.

Returning to FIG. 1, jammer 141 generates a jamming signal using the signal parameters supplied by signal classifier 155. In commercial off-the-shelf systems, noise, barrage or sweeping jamming is used because it is difficult to know the exact frequency and modulation type of the signal that needs to be jammed. However, since the signal classifier 155 of the disclosed system provides these signal parameters, a spot jammer may be employed. The main advantage of the spot jammer is that by limiting its bandwidth to cover only the known signal's bandwidth, it can be more efficient than other jammers in terms of jamming performance versus power consumption. The proposed spot jammer can be built with (a) one or more external antennas that are capable of transmitting a wide range of frequencies, (b) a signal generator that generates a jamming signal with the required center frequency and bandwidth, and (c) an RF amplifier which is responsible for boosting the power to the desired level. To make the jammers more effective and resistant to obstructions, it is preferable that they be placed in appropriate locations as determined by the terrain analysis and policy engine as described above.

Returning back to FIG. 1, controller 120 of the system is preferably implemented as software executing on a general purpose processor and should preferably be written to be as adaptable and modular as possible. User interaction with controller 120 is performed through user interface 105, which may be any type of conventional user interface. Preferably, controller 120 should communicate with other components of the system via TCP/UDP through the services management layer 130. Communication via TCP/UDP allows different components of the system to reside on different machines and at different physical locations. The system may also load XML files at startup to configure available services (service management layer 130), system policies (policy engine 110), and communication needs (Inner System Network Communication and Optimization 125). These XML files determine the overall system functionality, as well as how the system communicates with external devices. This allows new external devices and system functionality to be added simply by modifying XML files.

The case-based reasoner 153 manages a set of previous problems and solutions. When a learning type service is requested (e.g. learn new classes ("cluster learning") or optimize), the casebase is first checked for previously found similar solutions. Each case in the casebase is a (problem, action, utility) tuple. The casebase uses a distance measure (e.g. Euclidean) and utility score to determine similar cases to the current situation. The cases from the casebase are then used either to seed the learning process, or to bypass learning altogether.

The policy engine 110 maintains a knowledgebase 115 of system settings and policies that apply to system states. The policy engine 110 can either be sent updates about the system state, or asked policy queries about current or potential states. The policy engine also automatically fires if the current state of the system changes such that one or more of its polices become active. Furthermore, the policy engine can be dynamically updated with new policies while the system is running.

Optimization Engine 152 consists of a set of optimization algorithms. For example, such optimization algorithms may include particle swarm and genetic algorithms. The engine is also designed to allow for the addition of other optimization algorithms without any internal changes to the system. The inputs to this engine are the current data values (metrics), a set of values that can be adjusted (e.g., by knobs), a utility function, and an optional initial seed (e.g., initial knob values). The outputs of the optimization engine are a set of new 'optimal' knob values and the corresponding utility value. These outputs are used to optimize the overall operation of the system, and are also stored in the case-based reasoner 153 for future use. For example, optimizations can be performed to enhance jamming capabilities. The jammer node's position, energy usage, and the resulting collateral damage to neutral or friendly communications can be optimized, given the enemy node's location and waveform type, the jammer node's distance from the enemy node, and any available terrain type/occlusion information.

The cluster learning engine 157 may be based on a G-means/K-means hybrid clustering algorithm. The cluster learner collects "unknown" feature value samples from the system into bins. When a bin contains enough samples (as specified by the system), those samples are clustered using a mixture of K-means and G-means algorithms. If a resulting cluster size is large enough (as specified by the system), the samples in that cluster are returned to the system for use in training and optimization. The cluster learner is mainly used in the CNMS/CNEW system for unknown signal clustering and retraining of the signal classifier. In the standard K-means clustering algorithm, the number of clusters K must be selected by the user.

To eliminate this need for user input, we use an enhancement to the K-Means algorithm called G-Means. This is done by first automatically selecting a low number for K based on the number of samples in the system. Then K-means clustering is performed on the samples. The resulting clusters are then analyzed to see whether they have a given distribution (usually Gaussian, though other distributions can be used). If a particular cluster does not fit the given distribution within some threshold, then the K-means algorithm is re-run on the points of that cluster. This is repeated until all the clusters fit the given distribution within some tolerance.

The Service Management Layer (SML) 130 controls system components and system flow, based on the current mission. Missions are specified in XML files and may describe:

what actions should be taken by the system what devices/algorithms should be run where the results should be sent and how they will be used when and in what order services and results should be used New missions can be added to the system by simply modifying XML files—no code changes are required. The SML also controls communication with the attached devices, sensors, and cognitive services. These services can register and deregister with the SML at anytime during operation. This allows new services to be added or removed in real time. The System also allows action and flow to be modified instantaneously in the field by changing the active mission (chosen from a predefined list, e.g. Situation awareness, Attack, Protection, Support).

In summary, the system depicted in FIG. 1 is useful for many military and commercial applications where accurate monitoring, jamming, and protection from RF threats are deemed important. The system is also useful for monitoring and repairing military networks. Furthermore, the proposed techniques enable efficient use of signal processing resources. Moreover, they can be implemented within available hardware frameworks, such as the QNT Software Defined Radio and XG sensors available from Rockwell Collins, Inc. of Cedar Rapids, Iowa.

Reference-Based RF Feature Estimation

Techniques for reference-based RF feature estimation will be discussed with reference to FIGS. 6-10. These techniques for feature estimation may be used by SEI unit 156 of FIG. 1 to identify a specific emitter. While these reference-based techniques may be utilized by the system shown in FIG. 1, these techniques may also be used by any other system where it is desirable to estimate features from RF signals in order to perform specific emitter identification.

Figure 6:
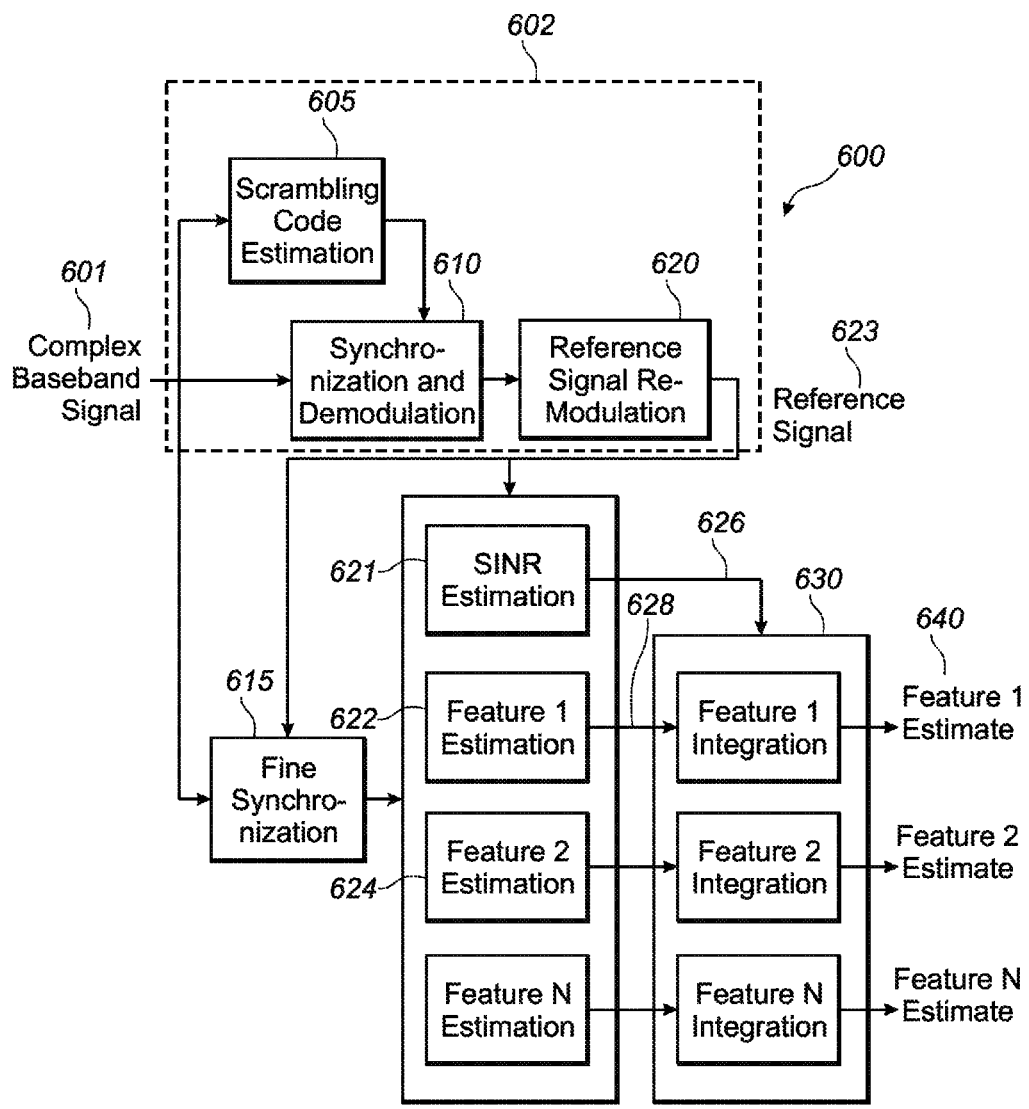
FIG. 6 shows a block diagram of a reference-based radio frequency feature estimation system according to one embodiment of the disclosure.

FIG. 6 is a block diagram depicting reference-based radio frequency feature estimation system 600. This particular system is applicable for use with spread spectrum CDMA signals, such as CDMA2000, W-CDMA, etc. The scrambling code estimation unit 605 searches for and estimates the scrambling code used by a signal of interest, in this case contained within a complex baseband signal 601 that may contain multiple spread spectrum signals, multipath echoes, other sources of interference, and/or noise. A more detailed description of scrambling code estimation is made with reference to FIGS. 11-18 below. An estimated scrambling code is used by the synchronization and demodulation unit 610 to perform timing and carrier recovery. This allows for the demodulation of a particular signal of interest. Synchronization and demodulation may be performed using any of a number of known techniques. The result is the estimated sequence of raw symbol values transmitted by the emitter of interest. Once a signal has been demodulated, a reference signal 623 is created by the reference signal re-modulation unit 620. In order to achieve this, the estimated modulation symbols are spread using the estimated spreading code and I and Q raw data values are modulated in the fashion prescribed by the type of signal used by the emitter of interest (e.g. W-CDMA). For example, in the case of W-CDMA HPSK Modulation, the remodulated signal will consist of I and Q raw data being spread by the prescribed spreading code and scrambled via the detected scrambling code. Scrambling code estimation unit 605, synchronization and demodulation unit 610, and reference signal re-modulation unit 620 taken together can be described as reference signal generator 602.

The reference signal 623 is used by the fine synchronization unit 615, SINR estimation unit 621, and any number of feature estimation units 622. The fine synchronization unit 620 performs a more accurate timing and carrier recovery by using the re-modulated reference signal rather than the estimated scrambling code. This may be accomplished by correlating the baseband signal 601 with the reference signal 623 to estimate the timing, carrier phase, and carrier frequency of the signal of interest. The estimated timing offset, carrier phase offset, and carrier frequency offset may then be removed from the complex baseband signal 601 to produce the synchronized complex baseband signal 624. Precise timing and carrier recovery enable accurate feature estimation.

Figure 7:
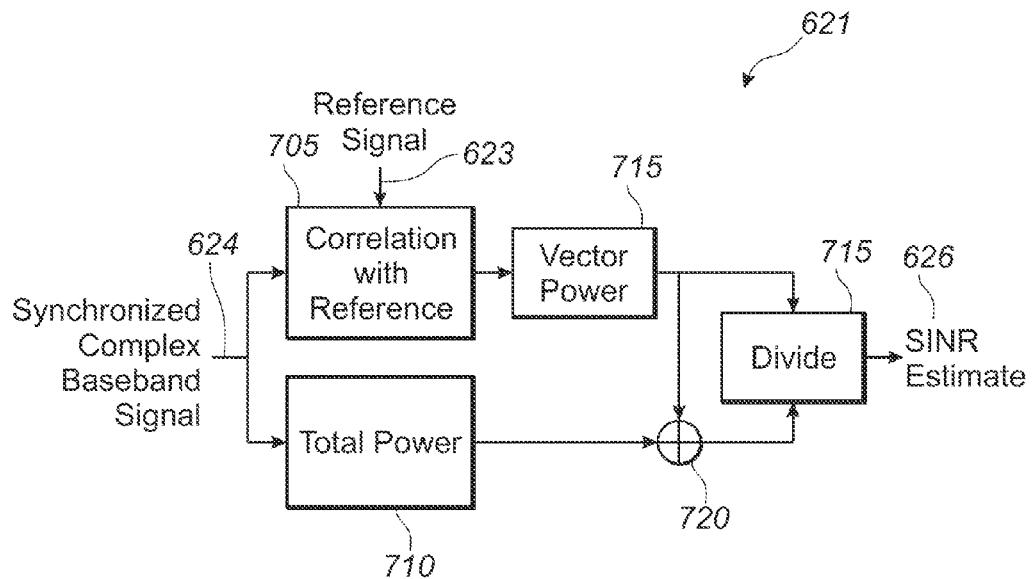
FIG. 7 shows a block diagram of an SINR estimation system according to one embodiment of the disclosure.

The SINR estimation unit 621 accepts a synchronized complex baseband signal 624 from the fine synchronization unit 615 and the reference signal 623 from the reference signal re-modulation unit 625. SINR estimation unit 621 produces an estimate 626 of the SINR at which a particular signal of interest is received. This may be achieved as shown in FIG. 7; however alternate methods of estimating the SINR may be used. The synchronized complex baseband signal 624 undergoes correlation 705 with the reference signal 623. The vector power 715 of the result is an estimate of the power of the signal of interest. The synchronized complex baseband signal 624 also undergoes total power estimation 710. The interference-plus-noise power is estimated by subtracting the estimated signal power 720 from the estimated total power. The SINR estimate 626 is produced by dividing the estimated signal power 725 by the estimated interference-plus-noise power.

Figure 8:
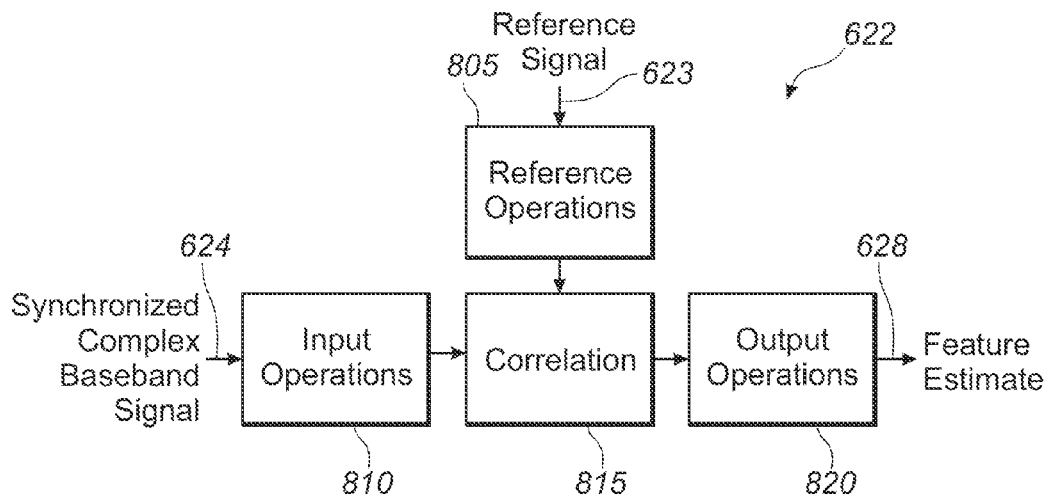
FIG. 8 shows a block diagram of one aspect of a reference-based radio frequency feature estimation system.

The feature estimation units 622 (labeled 1 through N) in FIG. 6 estimate N RF features of a particular signal of interest. In general, reference-based feature estimation may be achieved as shown in FIG. 8. A feature estimation unit 622 accepts a synchronized complex baseband signal 624 from the fine synchronization unit 615 and a reference signal 623 from the reference signal re-modulation unit 620. The synchronized complex baseband signal 624 may be passed through some set of input operations 810. These operations may consist of linear operations (e.g. filtering) and/or non-linear operations (e.g. frequency translation). The reference signal 623 may pass through a set of reference operations 805. These operations may consist of linear operations (e.g. filtering) and/or non-linear operations (e.g. frequency translation). The choice of operations depends upon the particular signal of interest, the feature to be estimated, the processing resources available, and the desired level of performance.

The output (or outputs) of the input operations 810 are correlated with the output (or outputs) of the reference operation 805 in correlation unit 815. The results of correlation unit 815 may then pass through a set of output operations 820. These operations may consist of linear operations (e.g. addition) and/or non-linear operations (e.g. vector power or vector phase). The choice of operations depends on the particular signal of interest, the feature (or features) to be estimated, the processing resources available, and the desired level of performance. The result is an estimate 628 of an RF feature of the signal of interest.

As an example, if the N features to be estimated are N coefficients in the time-domain impulse response of an emitter of interest, then the input operations 810 for each feature estimate may consist of a different delay (which is a linear operation) corresponding to each coefficient to be estimated. In this case, the reference operations 805 may simply pass the reference signal without modification and the output operations 820 may simply pass the output of the correlation 815 without modification. The result is a collection of N feature estimates 628 (each of which is a complex vector) that estimate the time-domain impulse response of an emitter of interest.

If, for example, features related to quadrature imbalance are to be estimated, then non-linear reference operations, such as taking either the real or the imaginary part, may be employed. Also, in this case, non-linear output operations such as vector power and vector phase may be employed.

Returning to FIG. 6, the feature integration units 630 (labeled 1 through N) perform long-term integration of feature estimates 628. This is achieved by weighting each estimate for a particular feature by the corresponding SINR estimate 626. This allows multiple estimates of a single feature observed at different times to be combined through a weighted average, even if each estimate was observed at a wildly different SINR. Combining multiple estimates of the same feature over time in this manner decreases the overall measurement error. The same technique may also be used to integrate feature estimates from multiple receivers.

The output of the feature integration units 630 is a collection of N feature estimates 640. A clustering algorithm, such as clustering learner unit 157 in FIG. 1, may accept the N feature estimates and use them to discern between and uniquely identify multiple specific RF emitters in an N-dimensional feature space.

The RF feature estimation technique presented here is based upon correlation with a reference signal. As a result, the feature estimation is able to reject interfering CDMA signals that are not using the same scrambling code. Also, this technique makes it possible to estimate RF features in the presence of multipath.

Figure 9:
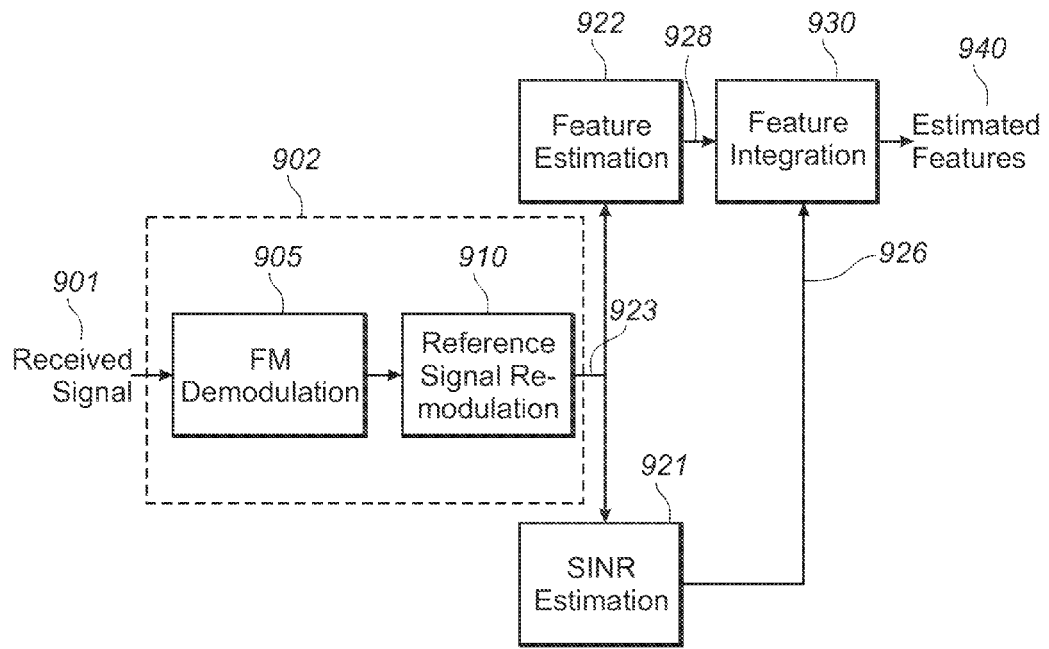
FIG. 9 shows a block diagram of an SINR estimation system according to an FM-based embodiment of the disclosure.

FIG. 9 is a block diagram depicting a reference-based RF feature estimation 900 for FM emitters. The FM demodulation unit 905 recovers the frequency modulated audio signal from the received signal of interest 901 by using standard FM demodulation techniques. The reference signal re-modulation unit 910 then frequency modulates the recovered audio signal to produce a reference signal 923. Frequency modulation inherently produces a signal with constant amplitude. If the reference signal 923 is not allowed to be distorted (i.e. undergoes no filtering) then it has essentially no incidental AM. FM modulation unit 905 together with reference signal re-modulation unit 910 can be described as reference signal generator 902. Reference signal 923 is used by the feature estimation unit 922 and the SINR (signal-to-interference-plus-noise ratio) estimation unit 921.

The feature estimation unit 922 in FIG. 9 estimates the RF features of a particular signal of interest 901 and a generated reference signal 923. A received FM signal typically has some amount of incidental AM caused by linear distortion in the FM emitter. This linear distortion varies from one FM emitter to the next. The re-modulated reference signal 923 is produced using a recovered version of the FM modulated audio signal carried by the received signal. However, the reference signal has essentially no incidental AM (if distortion of it is not allowed to occur). A set of RF features can be formed by comparing the received signal 901 (with incidental AM) to the reference signal 923 (with no incidental AM). Note that incidental AM caused by distortion incurred during reception of a signal of interest may be calibrated out. That is, if the receiver used for feature estimation causes significant linear distortion, as opposed to the linear distortion caused by the emitter, then the receiver's passband frequency response may be measured and equalized using a filter prior to the processing in FIG. 9.

Figure 10:
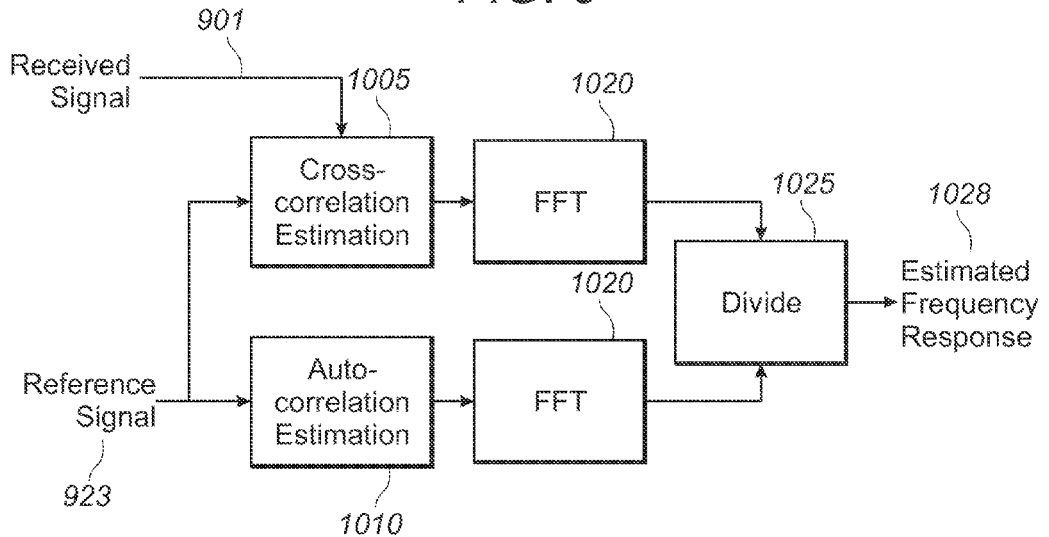
FIG. 10 shows a block diagram of one means for achieving such linear system estimation according to one embodiment of the disclosure.

One technique for forming a set of RF features arising from incidental AM is through linear system estimation. In this technique, features are formed through estimation of a hypothetical linear system with the re-modulated reference signal 923 as the input and the received signal 901 as the output. FIG. 10 is a block diagram of one means of achieving such linear system estimation. Cross-correlation estimation 1005 is performed between the received signal 901 and the reference signal 923, resulting in an estimate of the cross-correlation function for some number of lags. Auto-correlation estimation 1010 is performed on the reference signal 923, resulting in an estimate of the auto-correlation function for some number of lags. The estimated cross-correlation function is transformed into the frequency domain using a fast Fourier transform (FFT) 1020 (or other technique), resulting in an estimate of the cross-spectral density for some number of frequency bins. The estimated auto-correlation function is transformed into the frequency domain using an FFT 1020 (or other technique), resulting in an estimate of the power-spectral density for some number of frequency bins. Finally, the cross-spectral density estimate is bin-by-bin divided 1025 by the power-spectral density estimate, resulting in an estimated frequency response 1028 for some number of frequency bins.

A set of RF features may be formed by sampling the estimated frequency response of the linear system at various frequencies. Alternately, the estimated frequency response could be transformed into the time domain to estimate the impulse response. The impulse response estimate may then be sampled to form a set of RF features. Finally, a parametric representation of the linear system (such as an auto-regressive model) could be estimated and used as a set of RF features. Other methods of forming and estimating a set of RF features arising from incidental AM may also be appropriate.

The SINR estimation unit 921 in FIG. 9 accepts the received signal 901 and the re-modulated reference signal 923. It produces an estimate 926 of the SINR at which a particular signal is received. This may be achieved as shown in FIG. 7 and as described above. Alternate methods of estimating the SINR may be employed.

The feature integration unit 930 in FIG. 9 performs long-term integration of feature estimates 928 generated by feature estimation unit 922. This is achieved by weighting each estimate of a particular feature by the corresponding SINR estimate 926. This allows estimates of a single feature observed at different times to be combined through a weighted average even if each estimate was observed at a wildly different SINR. Combining multiple estimates of the same feature over time in this manner decreases the measurement error. The same technique may also be used to combine feature estimates from multiple receivers.

The output of the feature integration unit 930 is a set of integrated RF feature estimates 940. A clustering algorithm, such as clustering learner unit 157 in FIG. 1, may accept the feature estimates and use them to discern between and uniquely identify multiple specific FM emitters in a multi-dimensional feature space.

The various "units" discussed in the block diagrams of FIGS. 6-10 may be implemented in hardware, such as ASICs, FPGAs, DSPs and the like. In addition, each of the "units" may also be implemented as one or more software routines running on a general purpose processor. The "units" are meant to depict specific functionalities, and actual implementations may be tailored for the specific application desired.

Identifying a CDMA Scrambling Code

The specifics discussed with the following systems and methods are described relative to a WCDMA scrambling code. However, the general techniques are applicable to any spread spectrum system utilizing a scrambling code, such as CDMA, CDMA2000, TD-SCDMA, etc. In particular, the following techniques may be utilized by spreading code estimation unit 605 shown in FIG. 6 in a system for reference-based feature estimation. However, the following techniques are not limited to that application and may be utilized in any situation where it is desirable to identify a spreading code for an unknown spread spectrum signal.

First consider a 3G WCDMA uplink signal with a single control channel and a single data channel. The control and data channels are each spread by a spreading code before being scrambled. The two channels are added together to form a complex baseband signal with the control channel on the imaginary (quadrature) component and the data channel on the real (in-phase) component. This signal is then scrambled through the use of a scrambling code.

Figure 11A:
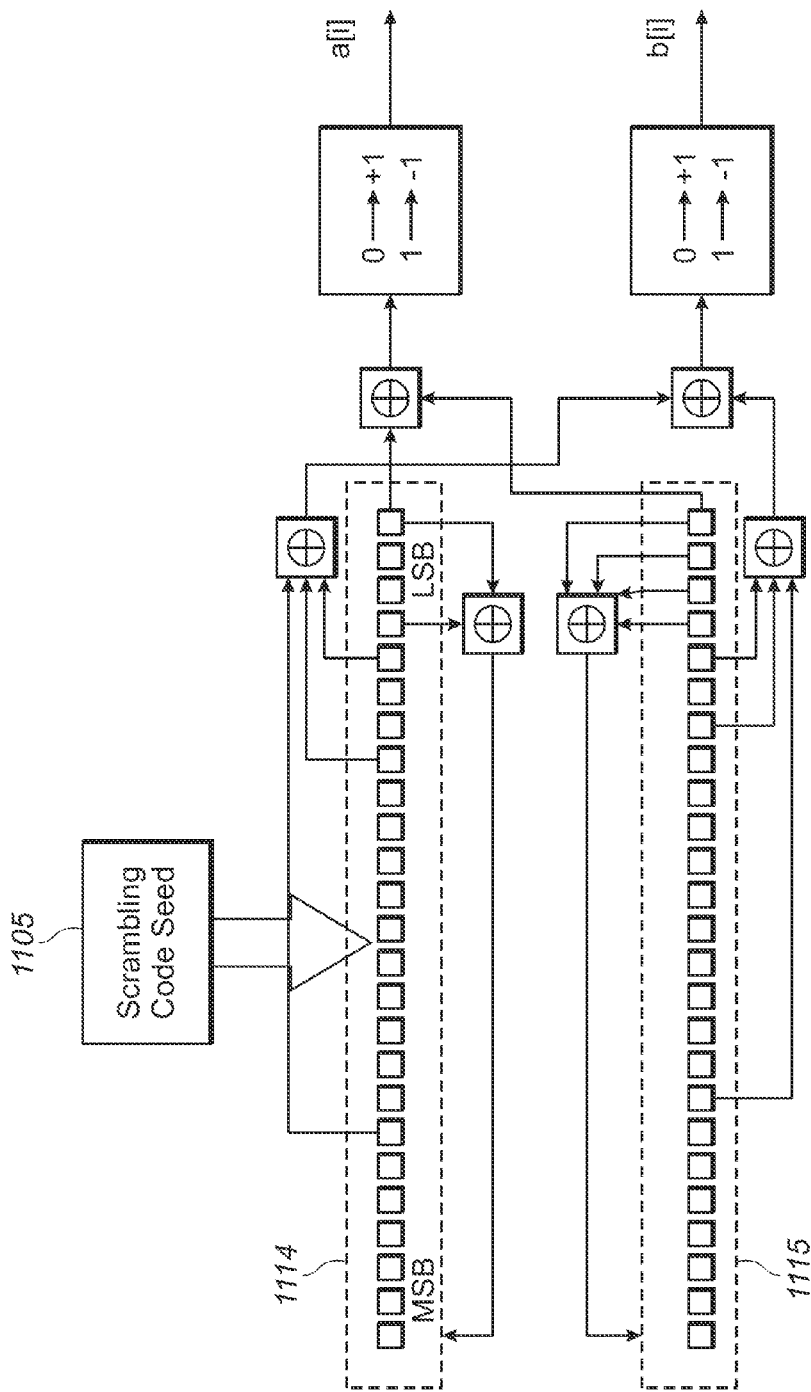
FIGS. 11a-b show a block diagram of a conventional technique for scrambling code generation.
Figure 11B:
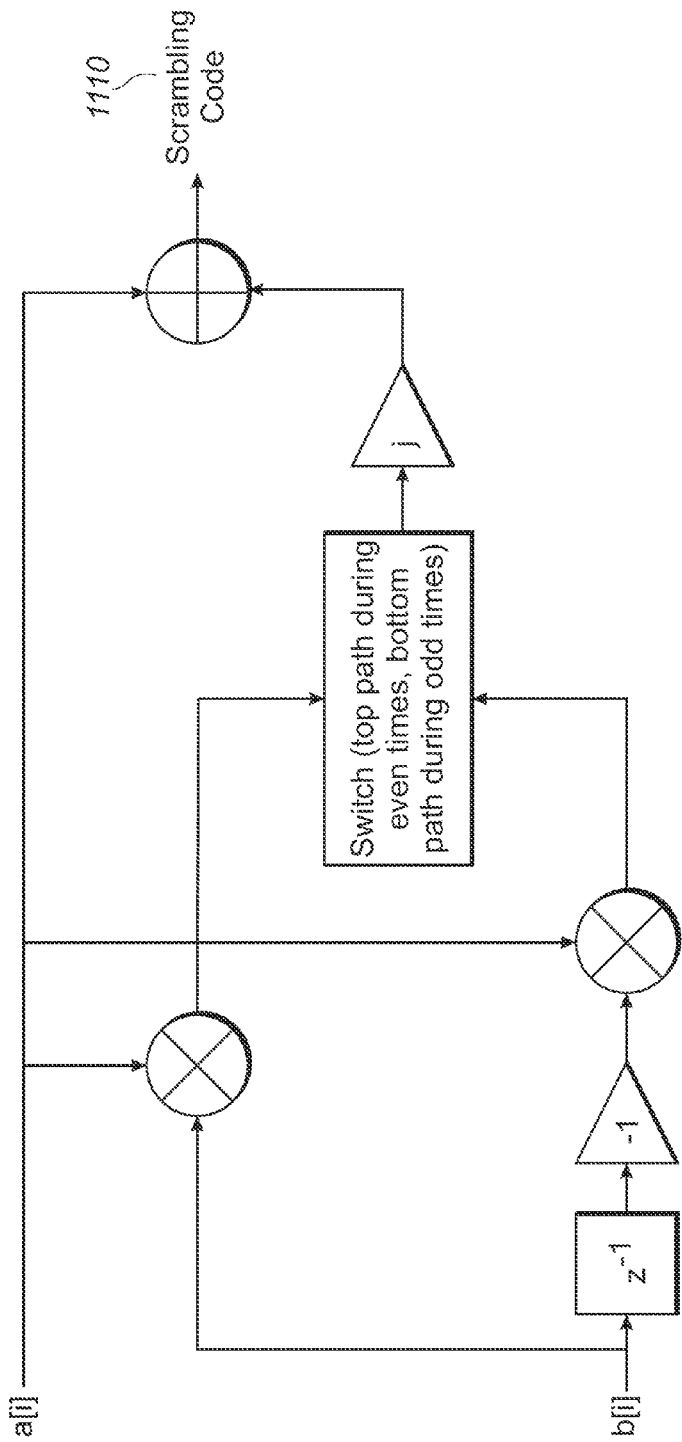

Scrambling code generation is depicted in FIGS. 11a and 11b. The 24-bit scrambling code seed 1105 is loaded into the least significant bits (LSBs) of the top 25-bit linear feedback shift register (LFSR) 1114. The most significant bit (MSB) of the top LFSR 1114 is initialized to 1. All bits in the lower 25-bit shift register 1115 are initialized to 1. The outputs of the shift registers are combined to form the sequences a and b indicated in FIG. 11a. FIG. 11b, shows the remainder of the generation of scrambling code 1110. Scrambling code generation is structured to reduce the number of zero-crossings in the final waveform, giving rise to Hybrid PSK (HPSK) modulation. A scrambling code is of length 38400, the number of chips in a 10 ms 3G WCDMA frame. The same scrambling code is typically reused in each frame for the duration of a call. Therefore, multiple frames can be used to help determine the scrambling code.

The scrambling process is simply a complex multiplication of the unscrambled signal with the scrambling code. The resultant scrambled signal is passed through a transmit pulse shaping filter and sent out on the channel. At the receiver, a noisy version of the signal is received and a receive pulse shaping filter is applied. The result is a noisy version of the original scrambled signal.

The problem we address is the recovery of the scrambling code used at the transmitter. Since there is a one-to-one correspondence between the scrambling code seed and the scrambling code itself, it also suffices to determine the seed and then regenerate the scrambling code. Note that the control channel, the data channel, the frame timing, and the effects of the communications channel are all unknown to the receiver. This makes it difficult to identify which of the 16.8 million possible seeds was used. However, due to the HPSK modulation and the spreading codes employed in the 3G WCDMA system, it is possible to generate a sequence of values that is a function of the transmitted signal yet is independent of the information sent on the control and data channels. In fact, the sequence depends only on the scrambling code seed. In addition, whether a particular seed was used can be determined by performing a correlation of this sequence with a noisy version obtained from the received signal.

While it is therefore a simple matter to evaluate a particular seed, two problems still remain. The first problem is searching through all 16.8 million possible seeds. Fortunately, by understanding the structure of how the scrambling code is generated from the seed, it is possible to find seeds that are more likely to result in a large correlation. By starting with these seeds in the search, the average time to find the correct seed is greatly reduced. The second problem is determining the frame timing. This can be addressed by exploiting the structure of the underlying LFSRs used in scrambling code generation.

Figure 12:
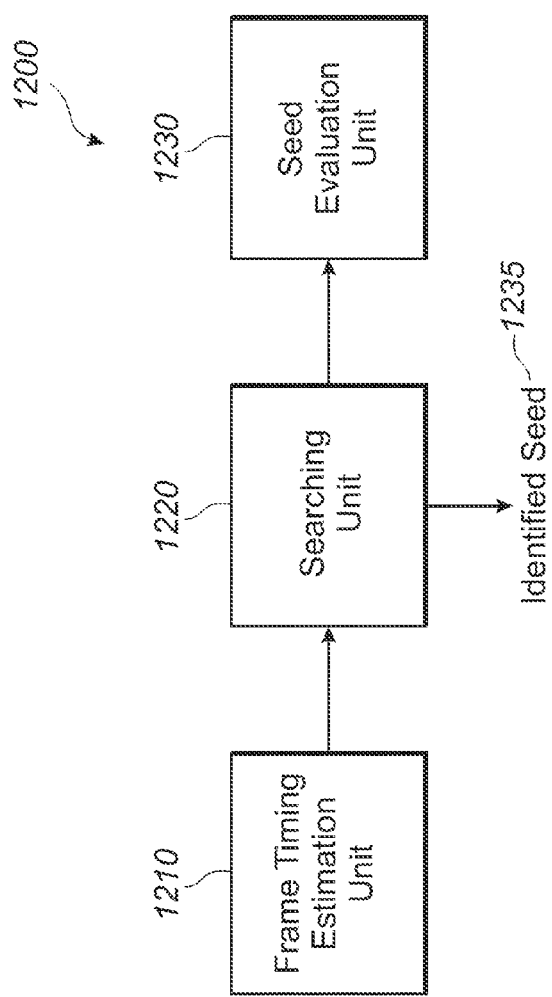
FIG. 12 shows a block diagram of a system for identifying a scrambling code according to one embodiment of the disclosure.
Figure 13:
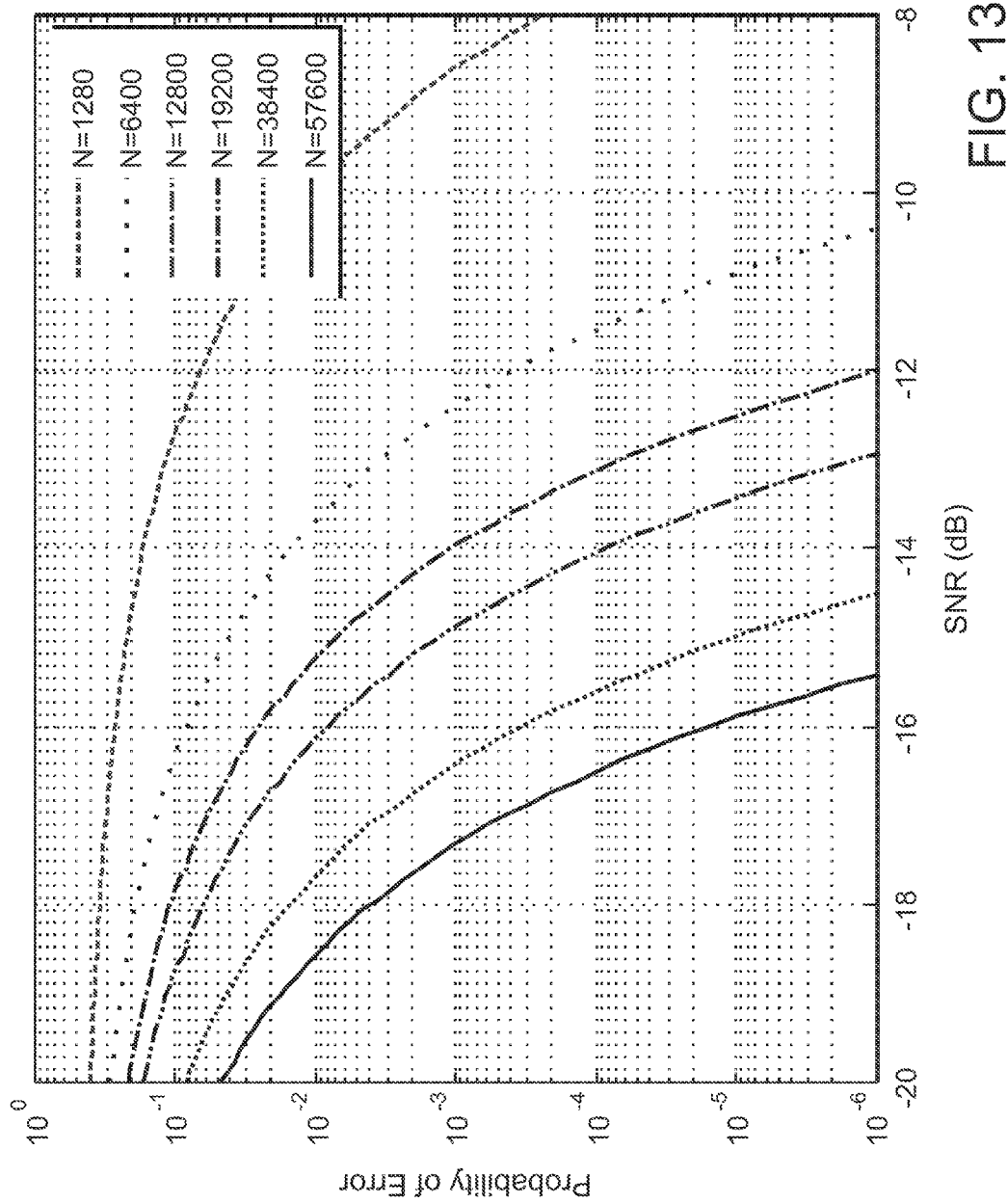
FIG. 13 shows a plot of the probability of error as a function of SNR for correlation lengths of 1, 5, 10, 15, 30, and 45 slots.

Given this background, a system for identifying a scrambling code may be constructed as shown in FIG. 12. A system 1200 for identifying a scrambling code consists of a frame timing estimation unit 1210, a searching unit 1220, and a seed evaluation unit 1230. The various "units" discussed in the block diagrams of FIG. 12 may be implemented in hardware, such as ASICs, FPGAs, DSPs and the like. In addition, each of the "units" may also be implemented as one or more software routines running on a general purpose processor. The "units" are meant to depict a specific functionality, and actual implementation may be tailored for the specific application desired.

At a high-level, the steps in finding the scrambling code are
1. Locate the point in time that marks the start of the scrambling code. This is accomplished by frame timing estimation unit 1210.
2. Determine an order in which to search through the scrambling code seeds. The order is designed to minimize the time to finding the correct seed. This is accomplished by searching unit 1220.
3. For each seed, perform a test that determines if the seed is correct. This test is independent of the data that was scrambled. Stop once the correct seed is found. This is accomplished by seed evaluation unit 1230.
4. Generate the correct scrambling code from the correct seed. This may accomplished using the standard techniques shown in FIGS. 11a-b.

Mathematical Quantities

While it is possible to understand scrambling code identification at a high-level, much of the design depends on the particular mathematics used in generating the scrambled signal. To be able to provide sufficient explanation of the design, we describe some mathematical quantities used later in this application.

a, b: the sequences of ±1s identified in FIGS. 11a-b (note: all sequences herein are indexed starting at 0)

s: the complex-valued scrambling code sequence identified in FIGS. 11a-b $s_R$, $s_I$: the real and imaginary parts of s, respectively; sequences of ±1s. As seen in FIGS. 11a-b, these are generated as $s_R[i]=a[i]$, $s_I[i]=a[i](-1)^i b[2\lfloor i/2 \rfloor]$ where $\lfloor \cdot \rfloor$ denotes the floor operation.

c, d: the spread control and data channels, antipodal real-valued sequences (i.e., c takes on values of ±|c| and d takes on values of ±|d|, where |c| and |d| are constants). Because of the spreading codes employed, for even values of i we have $c[i]=c[i+1]$, $d[i]=d[i+1]$.

x: the complex-valued scrambled signal, computed as $$x[i]=(d[i]s_R[i]-c[i]s_I[i])+j(d[i]s_I[i]+c[i]s_R[i])$$

Y: the noisy scrambled signal. We assume an additive white Gaussian noise (AWGN) channel in our analysis, but the techniques described herein will apply to other channels as well as interference from other handsets. We have $Y[i]=hx[i]+N[i]$ where h is some unknown complex scalar and the N[i] are independent and identically distributed (i.i.d.), zero-mean, circularly symmetric, complex Gaussian random variables with variance $\sigma^2$.

q: a detection sequence of ±1s at half the chip rate, defined as $q[n]=a[2n]a[2n+1]b[2n]$. It is implicitly a function of the scrambling code seed. It is shown in the section "Properties of q" that $x[2n+1]=-jq[n]x[2n]$ and $x[2n]x^*[2n+1]=j2(|c|^2+|d|^2)q[n]$, where the asterisk indicates complex conjugation.

Z: a noisy detection sequence at half the chip rate, defined as $\text{Im}\{Y[2n]Y^*[2n+1]\}$. Essentially a noisy version of q. It is shown in the section "Properties of Z" that at low SNR the log likelihood ratio for detection of q[n] is proportional to Z[n], thus making the sequence Z useful for the detection of the sequence q, and therefore for the detection of the scrambling code seed. It is also shown that the mean and variance of $Z[n]$ are given by $$E[Z[n]] = p\frac{SNR}{1+SNR}q[n], \text{Var}[Z[n]] = \frac{p^2}{(1+SNR)^2}\left(\frac{1}{2}+SNR\right)$$

where $p=p_s+p_n$ and $SNR=p_s/p_n$, with $p_s$ and $p_n=\sigma^2$ being the signal and noise powers, respectively.

r, v: two sequences of $\pm 1$s at half the chip rate. r is the seed dependent portion of the detection sequence and v is the seed independent portion of the detection sequence. v is equal to the sequence q generated from a seed with all zeros. r is defined through $r[n]=q[n]/v[n]$ (or equivalently, $r[n]=q[n]v[n]$) and is an implicit function of the scrambling code seed. It is shown in the section "Properties of r" that $r[n]r[n+3]r[n+25]=1$.

$\tilde{q}, \tilde{r}, \tilde{v}$: row vectors of bits, where the elements are given through the mapping (using $\tilde{q}$ as an example)

$$\tilde{q}_n = \begin{cases} 1, \text{if } q[n] = -1 \\ 0, \text{if } q[n] = +1 \end{cases}$$

Note that because of this mapping, we have $\tilde{q}=\tilde{r}+\tilde{v}$ where additions are XOR operations u: the scrambling code seed, a length 24 row vector of bits
G: a generator matrix composed of bits such that $\tilde{q}=uG+\tilde{v}$, where multiplications are AND operations and additions are XOR operations. Thus, $\tilde{r}=uG$.

Frame Timing Estimation Unit

Frame timing estimation unit 1210 is configured to determine the frame timing according to the techniques described below. This proceeds in two steps. In the first step, a timing offset that corresponds to an even numbered chip is found by maximizing a particular test statistic. In the second step, the remaining possible frame timing offsets (e.g., 19200 offsets for WCDMA) are examined using the cyclic correlation of two sequences. The offset that results in the largest correlation is selected as the correct frame timing. The particular metrics used are derived from the relationship between even and odd chip times in the scrambling code, as well as from the generating polynomial of the upper LFSR seen in FIG. 11a. Once the frame timing has been determined, the received signal is shifted so that a time of zero corresponds to the start of a frame. The resultant signal is passed to the searching unit 1220 for subsequent processing.

Figure 16:
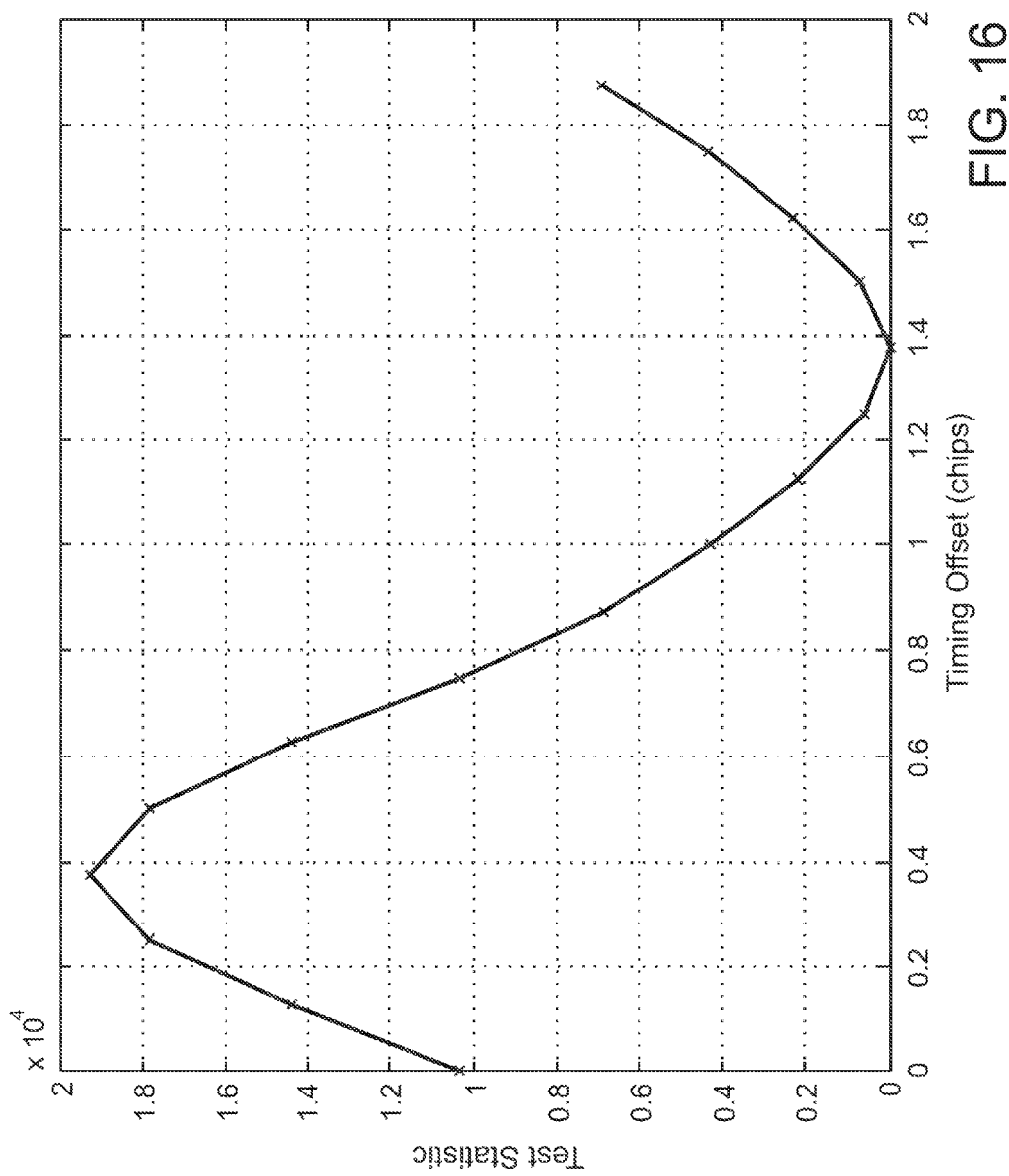
FIG. 16 shows a plot of timing offset by test statistic for a high SNR signal.

The first step in determining the frame timing is to determine the location of the even numbered chips. Suppose we arbitrarily (and most likely incorrectly) select an initial frame timing. We find the location of the even numbered chips by varying this frame timing by as much as one chip in either direction and maximizing the test statistic $$\sum_{n=0}^{19199}(\text{Im}\{Y[2n]Y^*[2n+1]\})^2 - \sum_{n=0}^{19199}(\text{Re}\{Y[2n]Y^*[2n+1]\})^2$$

where Y is the received signal. Note that this test statistic is at a maximum when $Y[0]$ corresponds to an even numbered chip because all the signal power is in the imaginary part of $Y[2n]Y^*[2n+1]$ (since Y is a noisy version of x and $x[2n]x^*[2n+1]$ is purely imaginary). Furthermore, the test statistic is at a minimum when $Y[0]$ corresponds to an odd numbered chip because the power is split evenly between the real and imaginary parts of $Y[2n]Y^*[2n+1]$. FIG. 16 illustrates the phenomenon for a high SNR signal. The incoming signal was sampled at 8 times the chip rate. The correct timing offset occurs at 0.375 chips. Note that when multiple frames of data are used, the values of $Y[2n] Y^*[2n+1]$ should be summed across the frames (using some arbitrary frame timing since the true frame timing is not known) before the real and imaginary parts are computed.

After locating the even numbered chips, the next step is to search the possible frame timings that remain. For a WCDMA signal this number is 19200. This is achieved by computing $$\arg\max_{0\leq k\leq 19199}\sum_{n=0}^{19199}\bar{v}[n]\bar{Z}[\langle n+k\rangle]$$

where $$\bar{v}[n] = \begin{cases} v[n]v[n+3]v[n+25] & 0 \leq n \leq 19174 \\ 0 & 19175 \leq n \leq 19199 \end{cases},$$

$$\bar{Z}[n] = Z[n]Z[\langle n+3\rangle]Z[\langle n+25\rangle],$$

and $\langle x \rangle$ is used as a shorthand for (x mod 19200).

Figure 17:
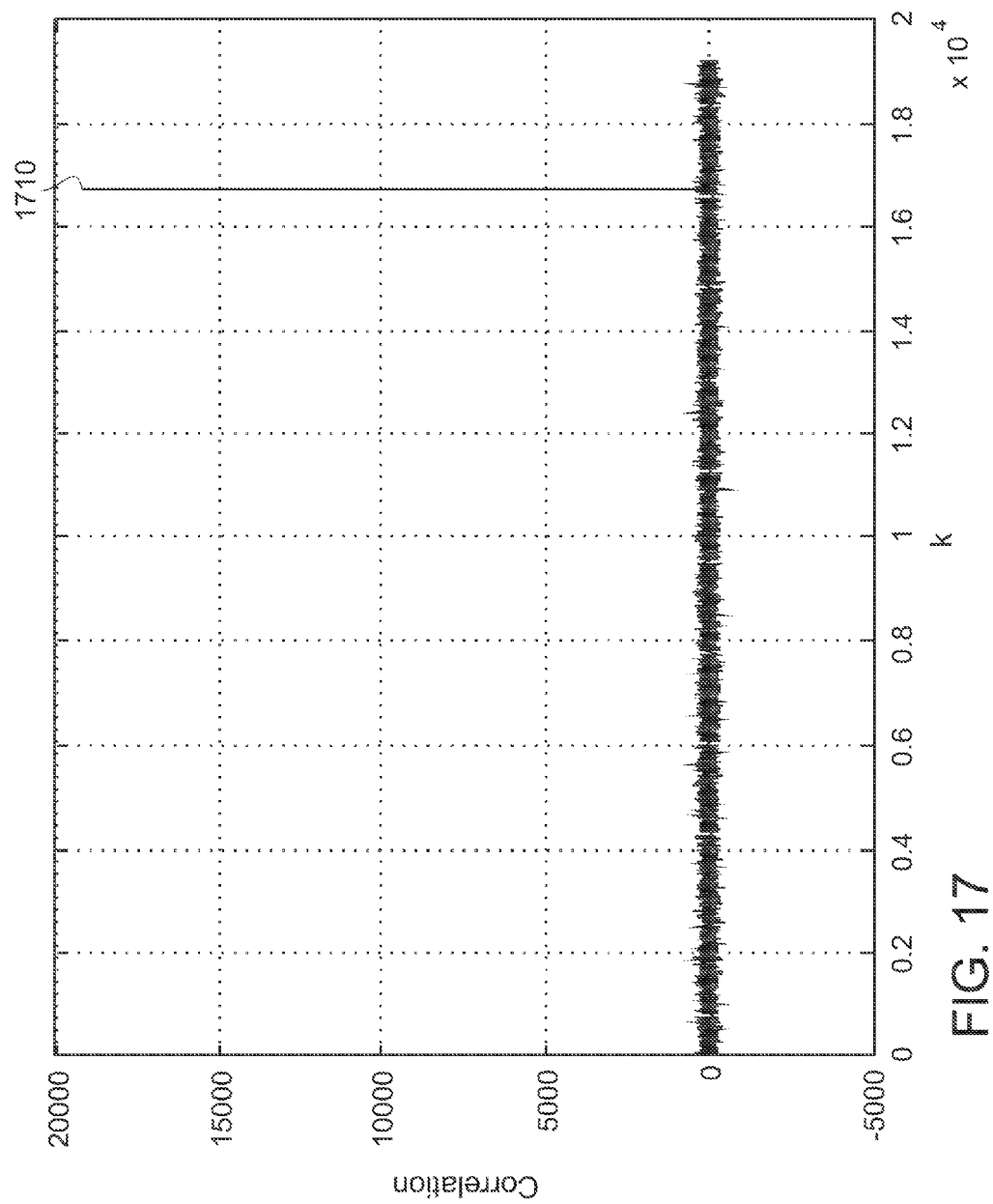
FIG. 17 shows a plot of the correlation output for estimating frame timing.

The frame timing estimation unit returns the offset into the sequence Z that corresponds to the start of a frame. If desired, the correlation in this expression can be implemented using FFTs of length 19200. While this may be faster in some settings, it may not be advantageous to do this in hardware as computing the correlation directly does not require any multipliers (because $v[n]$ takes on only two possible values). Note that if multiple frames of data are used, the values of Z should be summed across the frames before the correlation is computed. Using a single frame of a high SNR signal, the correlation is plotted as a function of k as shown in FIG. 17. The correct frame timing can be clearly identified at spike 1710.

To indicate why this works, consider the correlation in the estimator. When the frame timing is incorrect, the expected value of this correlation will be zero since approximately half the elements of the summation will be positive and half negative. We therefore seek to show that the expected value of the correlation is greater than zero when the frame timing is correct. For simplicity, assume k=0 corresponds to the correct frame timing. Then our task is to evaluate $$E\left[\sum_{n=0}^{19174}v[n]Z[n]v[n+3]Z[n+3]v[n+25]Z[n+25]\right]$$

In the section "Properties of r" it is shown that the sequence r satisfies $r[n]r[n+3]r[n+25]=1$, due to the form of the upper LFSR in FIG. 11a. Using this fact, we can write $$E\left[\sum_{n=0}^{19174}v[n]Z[n]v[n+3]Z[n+3]v[n+25]Z[n+25]\right] =$$

$$\sum_{n=0}^{19174}v[n]E[Z[n]]v[n+3]E[Z[n+3]]v[n+25]E[Z[n+25]] =$$

-continued $$\left(p\frac{SNR}{1+SNR}\right)^3 \sum_{n=0}^{19174} v[n]q[n]v[n+3]q[n+3]v[n+25]q[n+25] =$$

$$\frac{p^3 SNR^3}{(1+SNR)^3} \sum_{n=0}^{19174} r[n]r[n+3]r[n+25] = 19175\frac{p^3 SNR^3}{(1+SNR)^3}$$

This value is typically much larger than zero.

Figure 18:
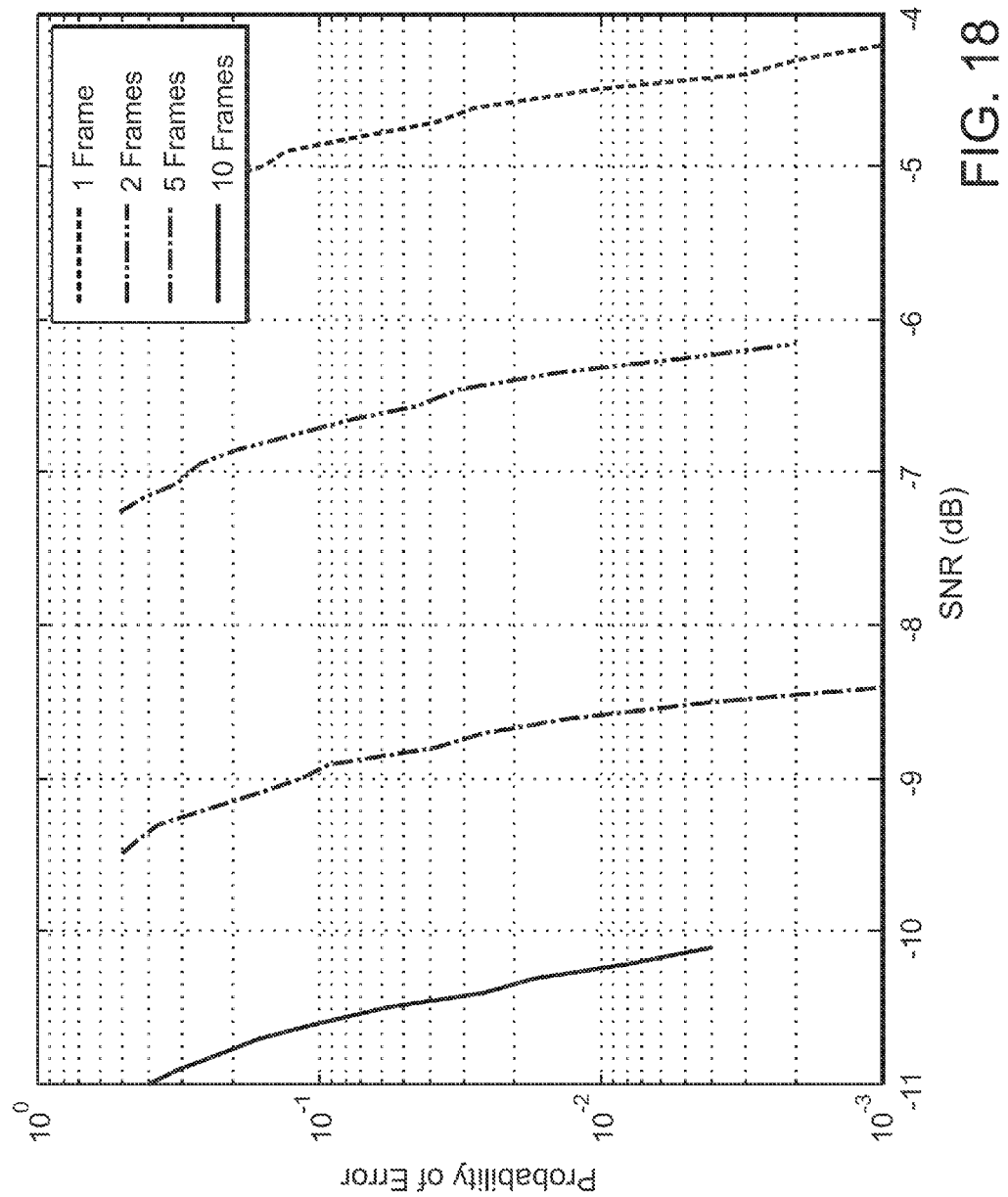
FIG. 18 shows a plot of the performance of frame timing estimation in additive white Gaussian noise.

Because of the properties of an LFSR, we can also write $r[n]r[n+3 \cdot 2^i]r[n+25 \cdot 2^i]=1$ for all $i \geq 0$. The correlation used above corresponds to $i=0$, but we can define correlations for other values of i and add the results together. However, it was found that this technique only improved performance in noise by approximately 2 dB. Thus, in what follows we consider only the single correlation presented above. FIG. 18 shows the performance of frame timing estimation in AWGN.

Searching Unit

Searching unit 1220 is configured to perform a search for the correct scrambling code seed. This unit first determines an order in which to search through the seeds. For each seed, the unit then submits the seed and the received signal to the seed evaluation unit 1230 and waits for a reply. The reply specifies whether the seed is correct. If the seed is correct, the scrambling code is generated from the identified seed 1235 and the process is complete. If the seed is not determined to be correct, the searching unit proceeds to the next candidate seed.

The goal is to search through the most likely candidates first so that the time to finding the correct seed is minimized. Because a seed will be considered correct if a correlation exceeds a threshold (see section on the seed evaluation unit below), we define the most likely candidates to be those that are predicted to result in the highest correlation.

The general procedure for picking a likely seed is as follows:

1. Select indices $n_i$ into the detection sequence q and noisy detection sequence Z for $i=1 \ldots 24$ and $q[n_i]$ for $i=1 \ldots 24$ such that:
   a. these values have not been selected previously,
   b. The summation $$\sum_{i=1}^{24} q[n_i]Z[n_i]$$

is large relative to other correlations, and
   c. the vectors $G_{n_i}$ for $i=1 \ldots 24$ are linearly independent, where $G_k$ denotes the $k^{th}$ column of G.
2. Compute $$\tilde{q}_{n_i} = \begin{cases} 1, & \text{if } q[n_i] = -1 \\ 0, & \text{if } q[n_i] = +1 \end{cases} \text{ for } i = 1 \ldots 24.$$

3. Use the elements of $\tilde{q}$ determined in step 2 to solve for the value of u, the scrambling code seed. This is possible because the required submatrix of G was made invertible in step 1.

Note that this procedure will be performed repeatedly until the correct seed is found.

With respect to the sum in step 1b above, it would be ideal to successively consider the largest possible sum, the second largest possible sum, etc. However, determining this sequence of values is computationally intensive. Instead, we have identified a set of rules for step 1 that have worked well in simulation.

The first time entering step 1 above, perform the following heuristic algorithm:

1. Sort the elements of noisy detection sequence Z in descending order of magnitude. Mathematically, compute a function $f$ such that $n=f(k)$ and $|Z[f(0)]| \geq |Z[f(1)]| \geq \ldots \geq |Z[f(19199)]|$.
2. Set $i=1$, $k=0$.
3. If $G_{f(k)}$ is linearly independent of $G_{n_j}$ for $j<i$, set $n_i=f(k)$, set $q[n_i]=\text{sign}(Z[n])$, and increment i.
4. If $i>24$, stop. Otherwise, increment k and return to step 3.

For subsequent times entering step 1, we keep the same values for $n_i$. However, we toggle the values of $q[n_i]$ according to a scheme defined by the following vectors:

$m_1=(0,0,0,\ldots,0,0,0,1)$
$m_2=(0,0,0,\ldots,0,0,1,0)$
$\ldots$
$m_{24}=(1,0,0,\ldots,0,0,0,0)$
$m_{25}=(0,0,0,\ldots,0,0,1,1)$
$m_{26}=(0,0,0,\ldots,0,1,0,1)$
$m_{27}=(0,0,0,\ldots,0,1,1,0)$
$m_{28}=(0,0,0,\ldots,1,0,0,1)$
$m_{29}=(0,0,0,\ldots,1,0,1,0)$
$m_{30}=(0,0,0,\ldots,1,1,0,0)$
$\ldots$
$m_{300}=(1,1,0,\ldots,0,0,0,0)$
$m_{301}=(0,0,0,\ldots,0,1,1,1)$
$\ldots$ This list of row vectors (each of length 24) indicate which values of $q[n_i]$ should be toggled relative to what was originally chosen (i.e. $\text{sign}(Z[n_i])$). A 1 indicates that the value should be toggled and a 0 indicates that it should remain the same. It can be seen that we first exhaust all possibilities for having originally chosen one value in error before proceeding to consider the possibility of two errors. This process continues until the final possibility is considered, which is that all values were originally chosen in error. By proceeding through all possible values of q in this way, we are trusting that our initial estimate for q was very nearly correct. This should be the case because the largest values of Z were used, the ones that have the biggest impact on the correlation. By using this method, we can expect to significantly reduce the number of possibilities that need to be considered.

Figure 14B:
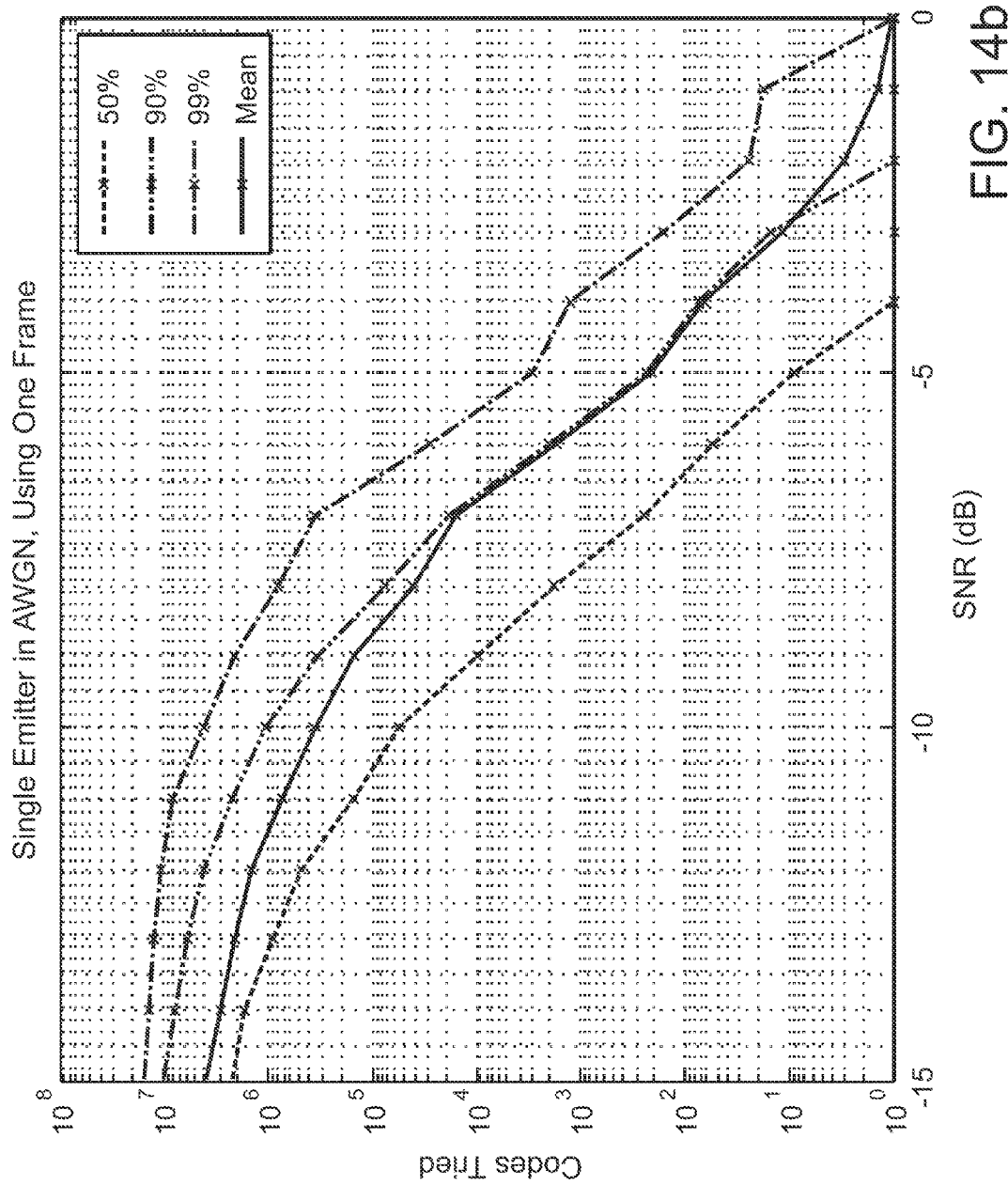
Figure 14C:
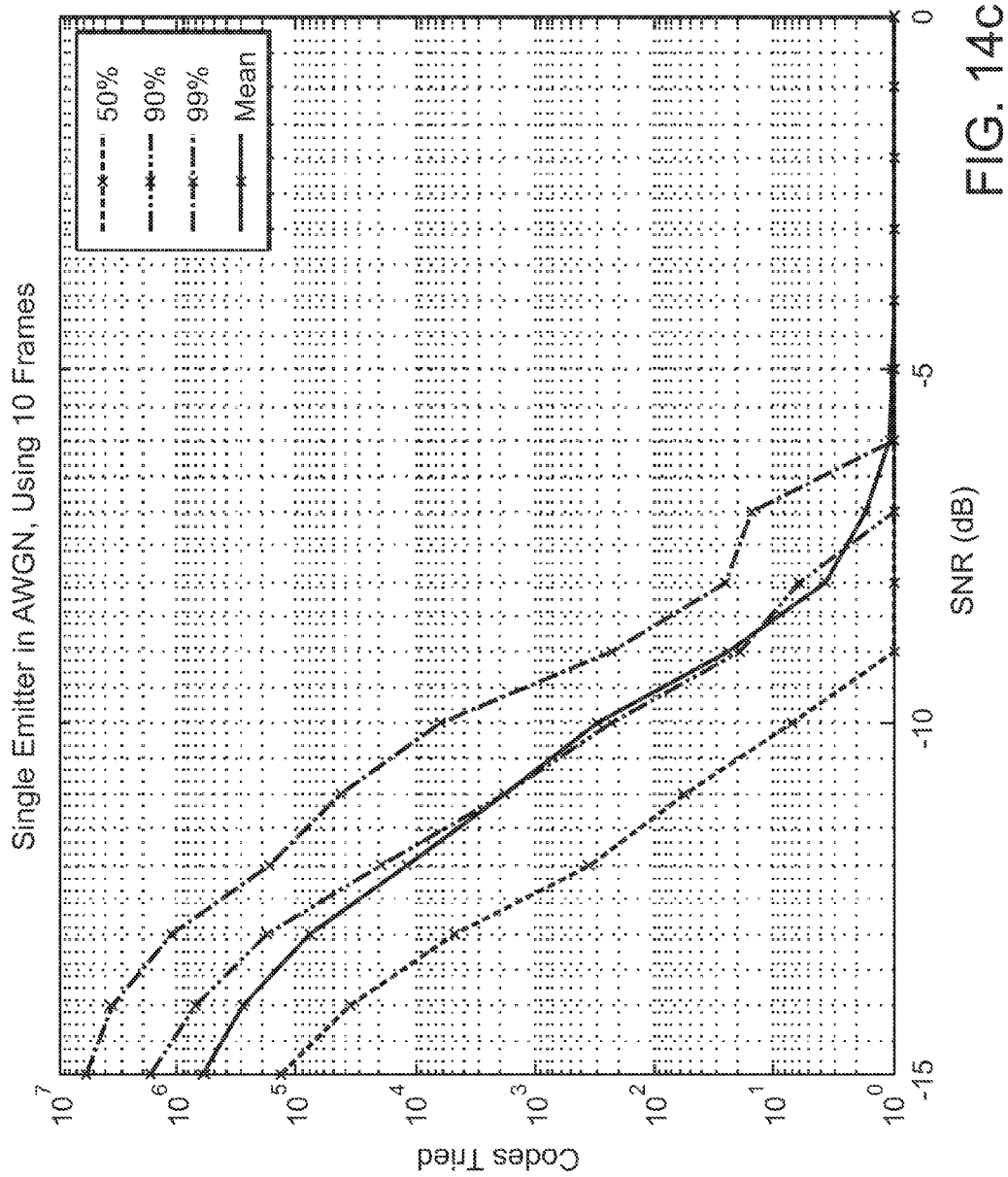

FIGS. 14*a-c* show the number of evaluations (i.e., correlations) performed before the correct seed is found for a single emitter in AWGN. FIG. 14*a* considers one slot's worth of values for Z[n] (there are 15 slots in a frame), FIG. 14*b* considers one frame, and FIG. 14*c* considers 10 frames. Note that when considering multiple frames, a computation can be saved by first summing the values of Z across the frames because the sequence q is periodic.

Figure 15A:
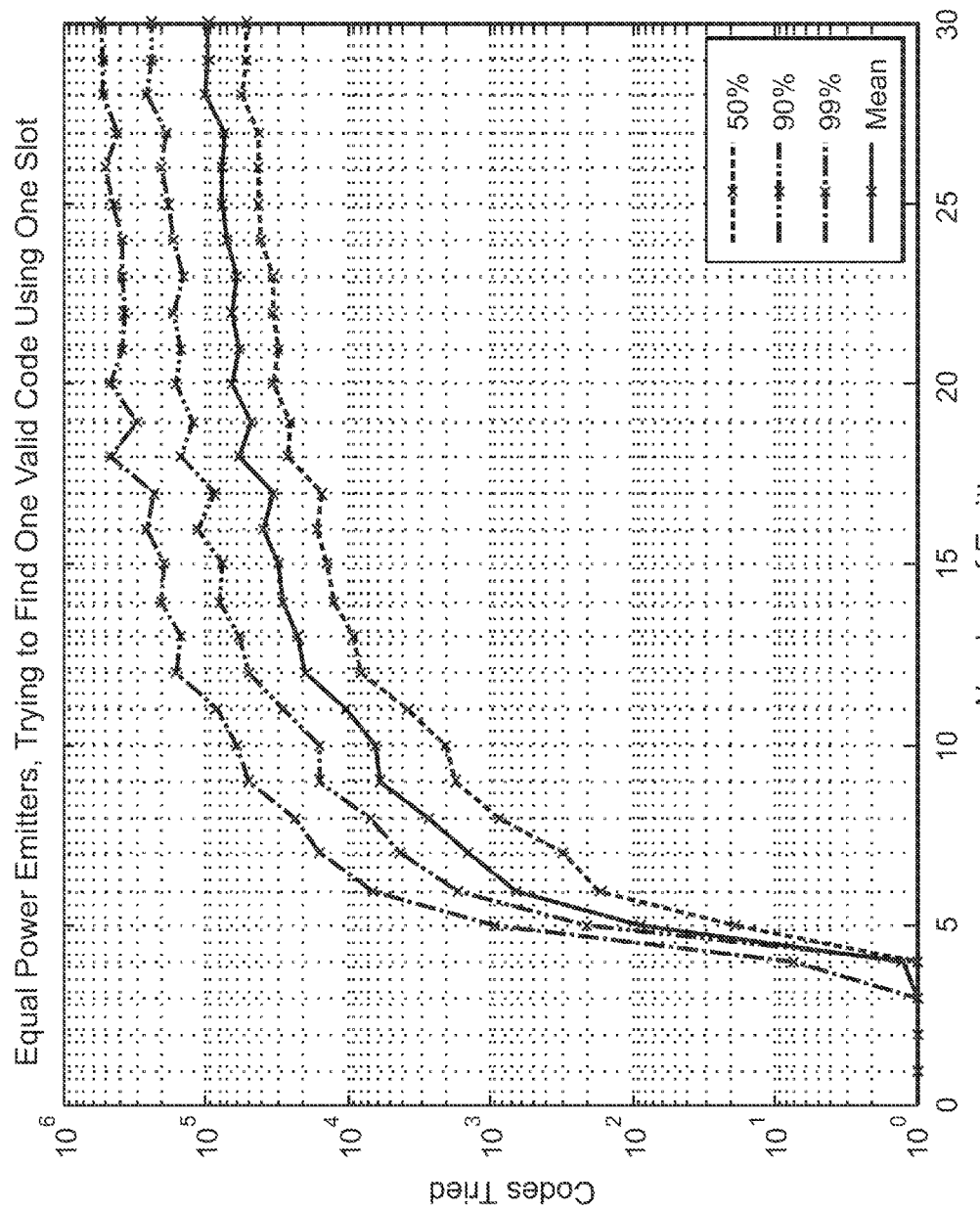
FIGS. 15a-c show a plot of the performance for multiple equal-power emitters in the presence of no noise.
Figure 15B:
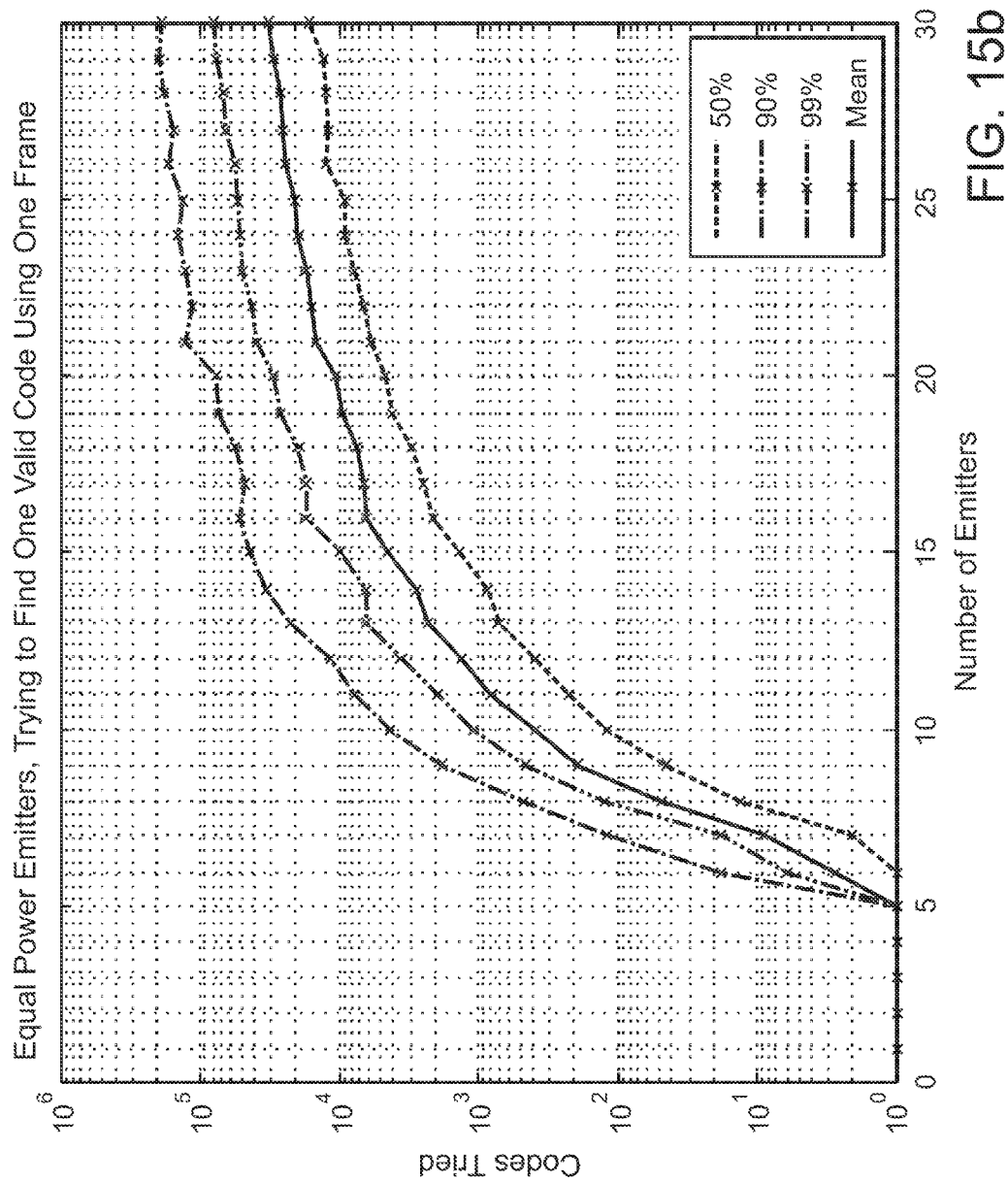
Figure 15C:
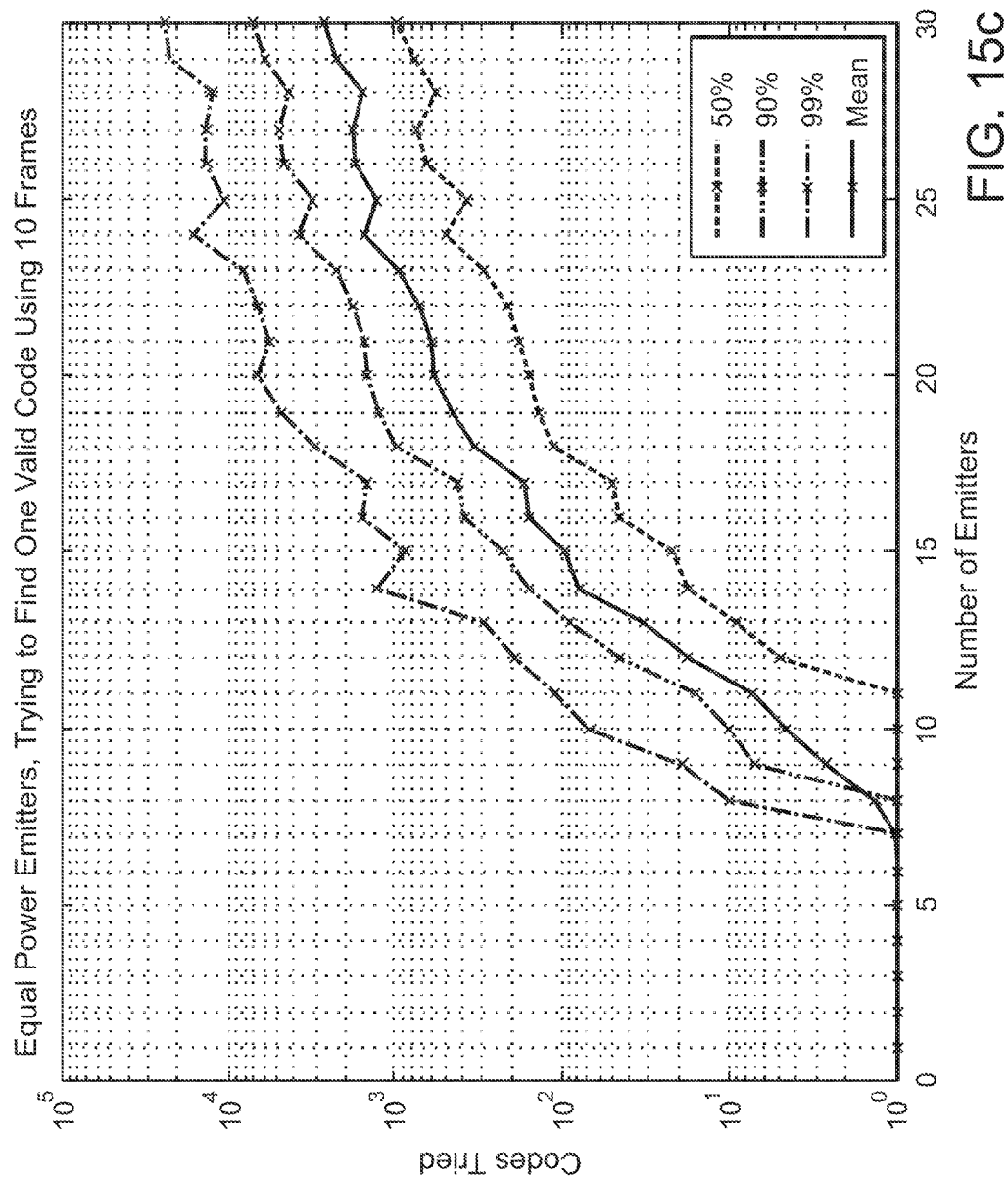

FIGS. 15*a-c* examine the performance for multiple equal-power emitters in the presence of no noise. The emitters have the same frame timing and a different random phase is applied to each emitter in each frame. The number of evaluations shown is the number to find only one of the valid scrambling code seeds. FIGS. 15*a-c* represent the performance for one slot, one frame, and 10 frame cases, respectively.

Seed Evaluation Unit

Seed evaluation unit 1230 is configured to determine whether a seed is correct. The seed evaluation unit accepts as input a seed to evaluate and the received signal and returns an indication of whether the seed is correct. For 3G WCDMA, the evaluation is achieved through a correlation between two sequences: one that depends on the seed and one that depends on the received signal.

The algorithm for evaluation of a seed u is
1. Generate sequence q using seed u.
2. If $$\sum_{n=0}^{N-1} q[n]Z[n] > \tau = \frac{NpSNR}{2(1+SNR)},$$

declare that the seed is correct. Otherwise declare that it is incorrect.

Note that the test takes the form of a correlation.

While other criteria could be used, the threshold $\tau$ has been selected to minimize the probability of error. The following derivation is SNR dependent. In practice, since the SNR may not be known a priori, a worst-case SNR may be used when defining the threshold. Let $H_1$ be the hypothesis that the seed is correct and $H_0$ be the hypothesis that the seed is incorrect. Using a central limit theorem argument and our expressions for the mean and variance of $Z[n]$ found in the section "Properties of Z", we have $$H_0: \sum_{n=0}^{N-1} q[n]Z[n] \sim N\left(0, \frac{Np^2}{(1+SNR)^2}\left(\frac{1}{2}+SNR\right)\right)$$

$$H_1: \sum_{n=0}^{N-1} q[n]Z[n] \sim N\left(\frac{NpSNR}{1+SNR}, \frac{Np^2}{(1+SNR)^2}\left(\frac{1}{2}+SNR\right)\right)$$

Note that under $H_0$ we have assumed that the correlation between our (incorrect) sequence q and the correct sequence is 0, which is approximately true. Selecting $$\tau = \frac{NpSNR}{2(1+SNR)}$$

yields the minimum probability of error, given as $$P_e = Q\left(\frac{\sqrt{N} \, SNR}{\sqrt{2+4SNR}}\right)$$

where Q is the complement of the standard normal cumulative distribution function. This probability of error is plotted as a function of SNR for correlation lengths of 1, 5, 10, 15, 30, and 45 slots in FIG. 13. Note that N=1280 corresponds to one slot as the sequence q is at one half the chip rate.

Properties of q

The algebra that follows takes advantage of the special properties of sequences of ±1s. For example, note that we can write a[i]=1/a[i] and (a[i])²=1. To see that x[2n+1]=−jq[n]x[2n] we write x[2n+1]=(d[2n+1]s_R[2n+1]−c[2n+1]s_I[2n+1])+j(d[2n+1]s_I[2n+1]+c[2n+1]s_R[2n+1])=(d[2n]a[2n+1]+c[2n]a[2n+1]b[2n])+j(−d[2n]a[2n+1]b[2n]+c[2n]a[2n+1])=q²[n]((d[2n]a[2n+1]+c[2n]a[2n+1]b[2n])+j(−d[2n]a[2n+1]b[2n]+c[2n]a[2n+1]))=q[n]((d[2n]a[2n]b[2n]+c[2n]a[2n])+j(−d[2n]a[2n]+c[2n]a[2n]b[2n]))=−jq[n](j(d[2n]a[2n]b[2n]+c[2n]a[2n])+(d[2n]a[2n]−c[2n]a[2n]b[2n]))=−jq[n]((d[2n]s_R[2n]−c[2n]s_I[2n])+j(d[2n]s_I[2n]+c[2n]s_R[2n]))=−jq[n]x[2n]

To see that x[2n]x*[2n+1]=j2(|c|²+|d|²)q[n] we write x[2n]x*[2n+1]=x[2n]jq[n]x*[2n]=j|x[2n]|²q[n]=j2(|c|²+|d|²)q[n]

Properties of Z

We first show that at low SNR the log likelihood ratio for detection of q[n] is proportional to Z[n]. The derivation is similar to one for differential phase shift keying (DPSK) because the value of q[n] is encoded in the phase shift of the waveform between two adjacent time instances.

For the moment, suppose that q[n], h, x[2n], and x[2n+1] are known. For notational convenience, let q=q[n], $Y_1$=Y[2n], $Y_2$=Y[2n+1], and v=h x[2n]. Then, using (24) and our knowledge of Gaussian random variables, the probability density for $Y_1$ and $Y_2$ is written as $$p_{Y_1 Y_2}(y_1, y_2) = \frac{1}{\pi^2 \sigma^4} \exp\left(-\frac{|y_1 - v|^2 + |y_2 + jqv|^2}{\sigma^2}\right)$$

This can be rewritten as $$p_{Y_1 Y_2}(y_1, y_2) =$$
$$\frac{1}{\pi^2 \sigma^4} \exp\left(-\frac{|y_1|^2 + |y_2|^2}{\sigma^2}\right) \exp\left(-\frac{2|v|^2}{\sigma^2}\right) \exp\left(\frac{2}{\sigma^2}(\text{Re}\{y_1 v^*\} - q\text{Im}\{y_2 v^*\})\right)$$

If we make the assumption that the amplitudes of x and h are known and that all carrier phases are equally likely, then we can replace v with r×exp(jΘ) where Θ is uniformly distributed on (−π,π]. The expected value of our density function is taken with respect to Θ. We start by taking the expected value of the last exponential function with respect to Θ (this is the only factor that depends on Θ). This yields $$\frac{1}{2\pi}\int_{-\pi}^{\pi} \exp\left(\frac{2}{\sigma^2}(\text{Re}\{y_1 re^{-j\theta}\} - q\text{Im}\{y_2 re^{-j\theta}\})\right) d\theta =$$

$$\frac{1}{2\pi}\int_{-\pi}^{\pi} \exp\left(\frac{2r}{\sigma^2}(\text{Re}\{y_1\}\cos\theta + \text{Im}\{y_1\}\sin\theta + q\text{Re}\{y_2\}\sin\theta - q\text{Im}\{y_2\}\cos\theta)\right) d\theta =$$

$$\frac{1}{2\pi}\int_{-\pi}^{\pi} \exp\left(\frac{2r}{\sigma^2}(\text{Re}\{y_1\} - q\text{Im}\{y_2\})\cos\theta + \frac{2r}{\sigma^2}(\text{Im}\{y_1\} + q\text{Re}\{y_2\})\sin\theta\right) d\theta$$

Using the identity $$I_0(|a|) = \frac{1}{2\pi}\int_{-\pi}^{\pi} \exp(\text{Re}\{a\}\cos\theta + \text{Im}\{a\}\sin\theta) d\theta$$

(where $I_0$ is the zero[th]-order modified Bessel function of the first kind) this can be rewritten as $$I_0\left(\frac{2r}{\sigma^2}|(\text{Re}\{y_1\} - q\text{Im}\{y_2\}) + j(\text{Im}\{y_1\} + q\text{Re}\{y_2\})|\right) = I_0\left(\frac{2r}{\sigma^2}|y_1 + jqy_2|\right)$$

This means that $$p_{Y_1Y_2}(y_1, y_2) = \frac{1}{\pi^2\sigma^4}\exp\left(-\frac{|y_1|^2+|y_2|^2}{\sigma^2}\right)\exp\left(-\frac{2r^2}{\sigma^2}\right)I_0\left(\frac{2r}{\sigma^2}|y_1+jqy_2|\right)$$

Now we no longer assume that q is known and write the log likelihood ratio. Based on the form of the density function, this quantity is given by $$\ln I_0\left(\frac{2r}{\sigma^2}|Y_1+jY_2|\right) - \ln I_0\left(\frac{2r}{\sigma^2}|Y_1-jY_2|\right)$$

This quantity is difficult to compute and requires that we know r. However, we can realize that at low SNR, the arguments to the Bessel functions will be small. For small values of x, we have that $\ln I_0(x) \approx x^2/4$. This means that at low SNR, we have a log likelihood ratio of approximately $$\frac{r^2}{\sigma^4}|Y_1+jY_2|^2 - \frac{r^2}{\sigma^4}|Y_1-jY_2|^2$$

which is proportional to $$|Y_1+jY_2|^2 - |Y_1-jY_2|^2$$

which does not depend on r. If we expand this and simplify, we find that the log likelihood ratio is proportional to $$Im\{Y_1Y_2^*\}$$

We now derive the mean and variance of Z[n]. Because Y is just a noisy version of x, for fixed x and h we can write the mean equation as $$E[Z[n]] = |h|^2|x[2n]|^2 q[n] = p_s q[n]$$

A preferred way to derive the variance is to first use the identity $$Im\{ab^*\} = \frac{1}{4}(|a+jb|^2 - |a-jb|^2)$$

to write $$Var[Z[n]] = \frac{1}{16}Var[|Y[2n]+jY[2n+1]|^2 - |Y[2n]-jY[2n+1]|^2]$$

The random variables Y[2n]+jY[2n+1] and Y[2n]−jY[2n+1] are independent because they are Gaussian with covariance matrix $$\begin{bmatrix}1 & j \\ 1 & -j\end{bmatrix}(\sigma^2 I)\begin{bmatrix}1 & j \\ 1 & -j\end{bmatrix}^H = 2\sigma^2 I$$

So we can write $$Var[Z[n]] = \frac{1}{16}(Var[|Y_1+jY_2|^2] + Var[|Y_1-jY_2|^2])$$

We also have $$E\left[\begin{bmatrix}Y[2n]+jY[2n+1] \\ Y[2n]-jY[2n+1]\end{bmatrix}\right] = hx[2n]\begin{bmatrix}1+q[n] \\ 1-q[n]\end{bmatrix}$$

Note that the quantities $$\left|\frac{Y_1+jY_2}{\sigma}\right|^2, \left|\frac{Y_1-jY_2}{\sigma}\right|^2$$

each have a non-central chi-square distribution. Using the properties of the non-central chi-square distribution, we can write $$Var[|Y_1+jY_2|^2] = 4\sigma^4 + 4\sigma^2|h|^2|x[2n]|^2(1+q[n])^2$$

and $$Var[|Y_1-jY_2|^2] = 4\sigma^4 + 4\sigma^2|h|^2|x[2n]|^2(1-q[n])^2$$

Because $(1+q[n])^2 + (1-q[n])^2 = 4$, we have $$Var[Z[n]] = \frac{1}{16}(8\sigma^4 + 16\sigma^2|h|^2|x[2n]|^2) = \frac{1}{2}p_n^2 + p_s p_n$$

where we have introduced the noise power $p_n = \sigma^2$.

It is difficult to estimate the quantities $p_s$ and $p_n$ from the received signal itself (because without knowing the scrambling code. So instead, it is preferable to let $p = p_s + p_n$ and $SNR = p_s/p_n$. The former quantity can be measured and the latter can be assumed to be a worst-case value. Then you can perform the algebraic manipulations, we find that we have $$E[Z[n]] = p\frac{SNR}{1+SNR}q[n]$$

and $$Var[Z[n]] = \frac{p^2}{(1+SNR)^2}\left(\frac{1}{2}+SNR\right)$$

Properties of r

We wish to show that r[n]r[n+3]r[n+25]=1. Because of the form of the upper LFSR, the sequence a has the property a[i]a[i+3]a[i+25]=1. The sequence b satisfies this same property since we can write b[i]b[i+3]b[i+25]=(a[i+4]a[i+7]a[i+18])(a[+7]a[i+10]a[i+21])(a[i+29]a[i+32]a[i+43])=(a[i+4]a[i+7]a[i+29])(a[i+7]a[i+10]a[i+32])(a[i+18]a[i+21]a[i+43])=1·1·1=1

If these sequences are downsampled, they satisfy the same property. For example, we can write a[2n]a[2(n+3)]a[2(n+25)]=a[2n]a[2n+6]a[2n+50]=(a[2n]a[2n+6]a[2n+25]a[2n+28])(a[2n+25]a[2n+28]a[2n+50])=a[2n]a[2n+6]a[2n+25]a[2n+28]=(a[2n]a[2n+3]a[2n+25])(a[2n+3]a[2n+6]a[2n+28])=a[2n]a[2n+3]a[2n+25]=1

Replacing a[2n] with a[2n+1] or b[2n] yields similar results. It easily follows that q[n]q[n+3]q[n+25]=1. Since v is just a particular example of q, we also have v[n]v[n+3]v[n+25]=1. If follows that r[n]r[n+3]r[n+25]=1.

Signal Separation and SINR Enhancement

Techniques for signal separation and SINR enhancement will be discussed with reference to FIGS. 19-23. These techniques are applicable for any application in which it is desirable to improve signal quality and/or detect unknown signals in a noisy environment. For example, the techniques for signal separation and enhancement may be utilized by detector 143 of FIG. 1, or the feature estimation system shown in FIGS. 6 and 9. By enhancing the SINR, as well as separating out known signals from a noisy signal, additional unknown signals become easier to detect, identify, and manipulate.

Figure 19:
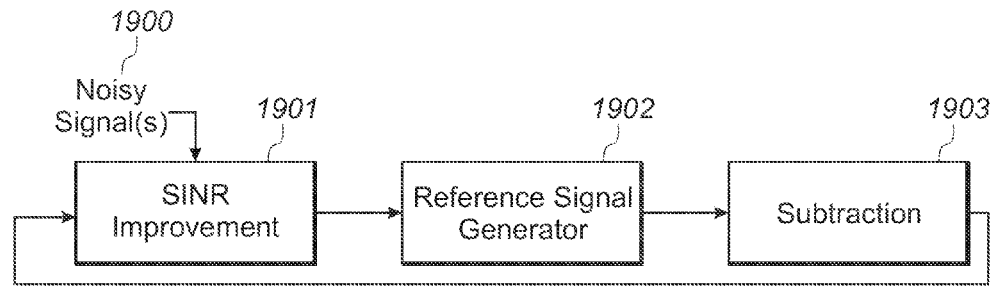
FIG. 19 shows a generalized block diagram for signal separation and SINR enhancement according to one embodiment of the disclosure.

FIG. 19 shows a generalized block diagram for signal separation and SINR enhancement. As can be seen, signal separation and SINR enhancement according to this embodiment is an iterative technique. One or more noisy signals 1900 are received into SINR improvement unit 1901. Each received signal is the sum of one or more emitters' (known or unknown) transmitted signals after having been passed through unknown channel impulse responses.

Figure 22:
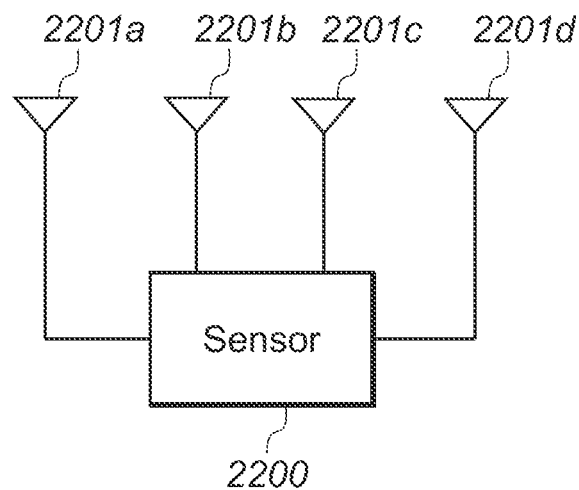
FIG. 22 shows an example of a system with a single sensor and multiple antennas.

In SINR improvement unit 1901, the noisy signals 1900 from one or more antennas or nodes are manipulated together to improve the SINR for at least one emitter's signal. As examples, we discuss two different techniques for SINR improvement. The one to use largely depends on the number of antennas present at each sensor. Referring to FIG. 22, if there are multiple antennas 2201a-d at one or more sensors 2200, beamforming may be used to achieve this SINR improvement on a per-sensor basis. Since the locations of the emitters are not known a priori, blind beamforming is used. One such technique is independent component analysis (ICA), which attempts to filter, weight, and sum the received signals in a way that makes the resultant signals appear non-Gaussian, based on a statistical criterion such as kurtosis or entropy. Such a procedure is justified because of the central limit theorem, which (approximately) states that sums of many independent signals appear to be Gaussian. The result of ICA is a set of signals, each of which ideally should contain a mixture of signals from only a subset of the emitters. There are many ways of implementing ICA. Some techniques apply only to instantaneous mixtures, where signals are not filtered before being weighted and summed. However, others apply to convolutive mixtures, where the signals first pass through a filter. ICA for convolutive mixtures is more complex, but allows for compensation for multipath interference. The choice of whether to assume instantaneous or convolutive mixtures is based on the types of environments likely to be encountered.

FIG. 22 shows one example of a single sensor with four antennas, however, ICA techniques can be applied to signals received from any sensor with more than one antenna.

Figure 23:
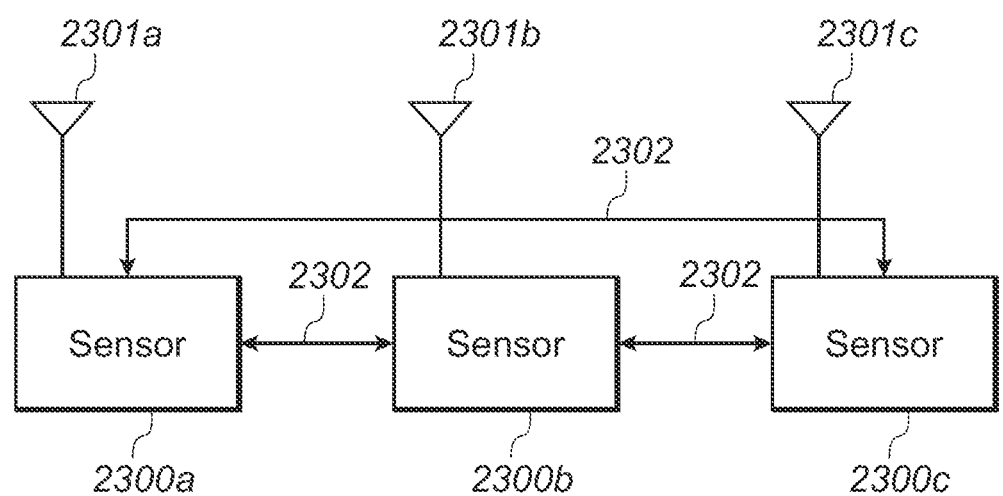
FIG. 23 shows an example of a system with multiple sensors each with a single antenna.

If there are not multiple antennas at each sensor, as shown in FIG. 23, SINR improvement is not performed on a per-sensor basis. Instead, SINR improvement can be performed by combining the received signals from multiple sensors 2300a-c, each with at least one antenna 2301a-c, through the use of ICA for convolutive mixtures (since the transmitted signals will experience different delays to each sensor) or a similar technique. However, this technique is less preferred, since the process of collecting sensed signals from all the sensors increases the need for intersensor communications 2302 in order to consolidate the signals. Intersensor communications 2302 may be implemented through any communication technique, including both hardwired and wireless communications. Note that FIG. 23 shows the use of three sensors, however, ICA for convolutive mixtures techniques for SINR improvement may be applied to any system with at least two sensors Next, reference signal generator 1902 generates a reference signal from the SINR-improved signal produced by SINR improvement unit 1901. In essence, reference signal generator unit 1902 is reproducing the original signal produced by a specific emitter that received as part of noisy signal(s) 1900. This reference signal may be generated according to the techniques for reference signal generation units 602 and 902 shown in FIGS. 6 and 9 and discussed above. This reference signal can then be used for RF feature estimation, specific emitter identification, or any other purpose where it would be desirable to recover an emitter's signal free of noise or interference.

Figure 20:
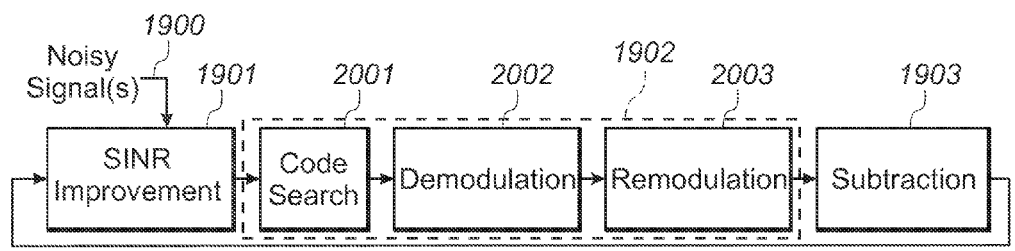
FIG. 20 shows a block diagram of an embodiment for generating a reference signal for a spread spectrum or CDMA-based emitter signal.
Figure 21:
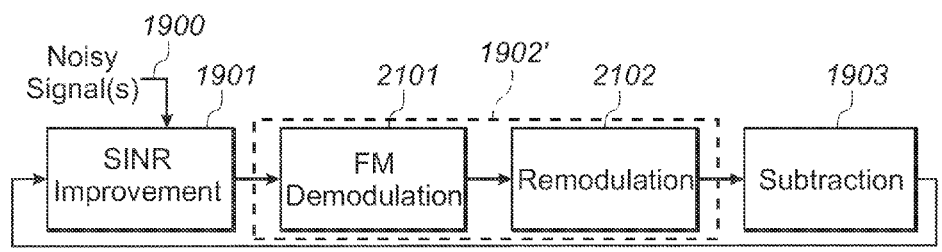
FIG. 21 shows a block diagram of an embodiment for generating a reference signal for FM-based emitters.

FIGS. 20 and 21 show two embodiments that utilize the reference signal generation techniques of FIGS. 6 and 9, respectively. FIG. 20 shows the embodiment for generating a reference signal for a spread spectrum or CDMA-based emitter signal. In this case, reference signal generator 1902 includes a code search unit 2001, a demodulation unit 2002, and a remodulation unit 2003. Code search unit 2001 is configured to identify the scrambling code for a particular emitter. Techniques for identifying a scrambling code are described above with reference to FIGS. 11-18. Once the scrambling code is found, the emitter's signal can be demodulated by demodulation unit 2002 and then remodulated by remodulation unit 2003 to generate a clean reference signal substantially free of noise or interference.

Similarly, FIG. 21 shows an embodiment that generates a reference signal from FM-based emitters. Techniques for generating an FM-based reference signal are discussed in more detail with reference to FIG. 9 above. As shown in FIG. 21, reference signal generator 1902 includes an FM demodulation unit 2101 configured to demodulate one FM signal from the SINR improved noisy signal. Then, remodulation unit 2102 remodulates this signal to create a clean reference signal substantially free of noise or interference.

The resulting reference signal, whether generated from a CDMA or FM-based signal, can then be used to estimate the channel impulse response encountered by that emitter's signal for each antenna. The contribution from the emitter can then be approximately subtracted from each received signal at subtraction unit 1903. At this point, the process repeats until no more signals can be identified. In this way, if sensors 2200 or 2300a-c are receiving two or more unknown signals, the signal with the highest SINR can be identified first and then subtracted from all the other unknown signals. Since one signal basically functions as interference for every other signal, subtracting a known signal from a group of unknown signals improves the SINR for the unknown signals. Furthermore, as this is an iterative process, the techniques for SINR improvement employed by SINR Improvement unit 1901 are repeated after the subtraction, thus further improving the SINR for the remaining unknown signals.

Note that the desirability for SINR improvement depends on the locations and powers of the emitters under consideration. In many cases, there may be one or more emitters that have high SINRs before the SINR improvement process due to their proximity to a particular sensor. Once these emitters have been subtracted off, there may be yet other emitters that emerge with high SINRs. As more and more emitters are eliminated, it may happen that there are several emitters remaining with approximately equal powers. However, at this point there may be so few emitters remaining that their SINRs, while less than 0 dB, are high enough to allow for identification of the corresponding signals.

The various "units" discussed in the block diagrams of FIGS. 19-23 may be implemented in hardware, such as ASICs, FPGAs, DSPs and the like. In addition, each of the "units" may also be implemented as one or more software routines running on a general purpose processor. The "units" are meant to depict specific functionalities, and actual implementations may be tailored for the specific application desired.

Figure 24:
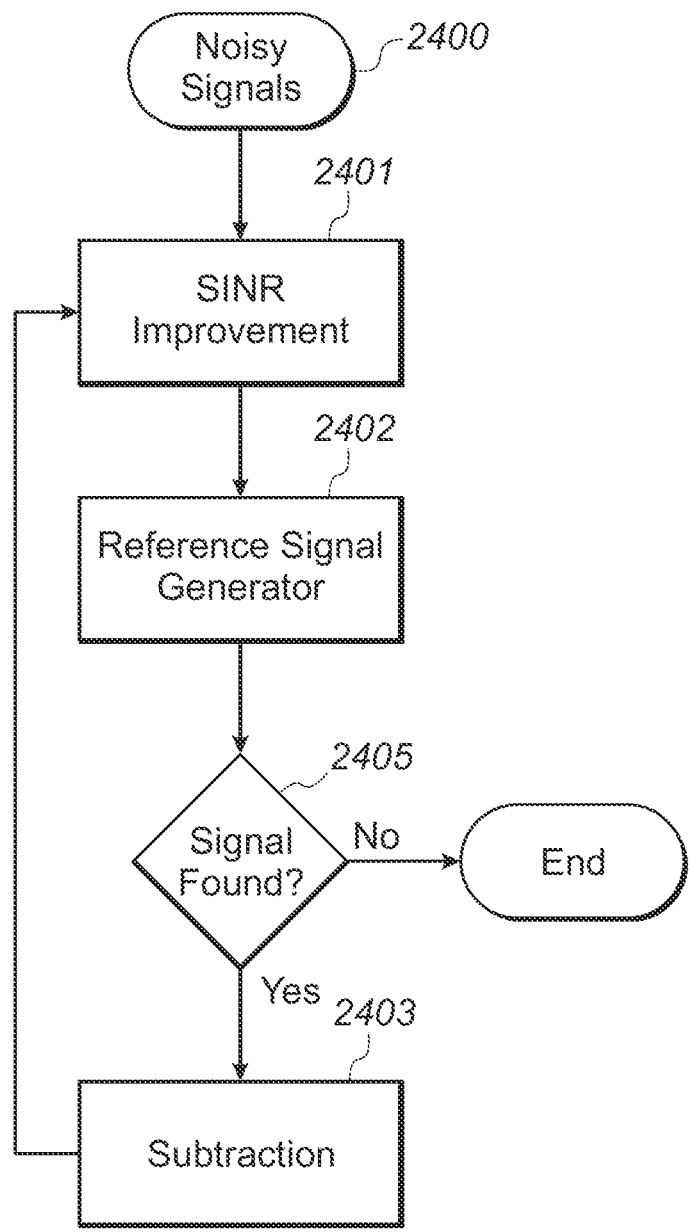
FIG. 24 shows a flowchart for a method for signal separation and SINR enhancement.

As indicated above, the techniques described with reference to FIGS. 19-23 may be thought of as a computer-implemented method. For example, each of the techniques may be embodied in software that is executable on a processor. FIG. 24 shows a flowchart of the method steps for such an embodiment. First in step 2401, the SINR of noisy signal 2400 is improved using the independent component analysis techniques described above. Next in step 2402, a signal is identified and a reference signal is generated from the SINR-improved noisy signal. Signal identification and reference signal generation may be accomplished for any type of signal. Specific examples of signal identification and reference signal generation for CDMA and FM-based signals is described with reference to FIGS. 20-21 above.

In step 2405, it is determined if a signal is able to be identified in step 2402. If no, the process ends. If yes, that signal is subtracted from the SINR-improved noisy signal in step 2401. The resultant signal is then fed back to step 2401, where SINR improvement techniques may be employed again on the resultant signal. This process continues to repeat until no more signals can be found at step 2402.

Specific Emitter Identification

FIGS. 25-28 describe the apparatus and techniques for SEI according to this disclosure. SEI unit 156 in FIG. 1 may be configured to execute these techniques. The specific techniques discussed are directed to 3G mobile phone standards (e.g., WCDMA). However, these techniques are applicable for SEI of other types of communication techniques as well. It is observed that the RF characteristics of signals transmitted from different individual electronic emitters differ due to the small variations in the analog electronics of each emitter's hardware, particularly the analog filtering.

Figure 25:
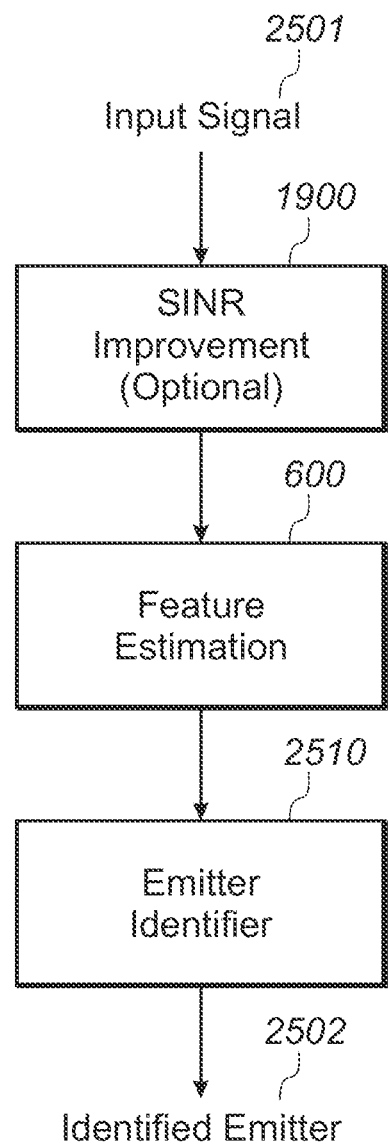
FIG. 25 shows a generalized block diagram of an SEI system according to one embodiment of the disclosure.

FIG. 25 shows a generalized block diagram of one embodiment of an SEI system according to one embodiment of the disclosure. First, an input signal 2501 is received by the system. This signal is complex data that may include noise and various known and unknown signals. As one example, this signal may be sensed by spectrum sensor 145. In addition, detector 143 may be used to verify if an actual emitter signal is present in the input signal before being passed to the SEI system according to the techniques described with reference to FIGS. 2a and 2b above.

In order to exploit the small variations in the analog electronics of an emitter, the Signal-to-Noise Ratio (SNR) of the sensed signal is preferred to be high. However, the sensed emitter signals in field may be primarily limited by the Signal-to-Interference-plus-Noise Ratio (SINR), due to the presence of many interferers (e.g., other emitters), and propagation channel effects which include multipath interference. As such, it may be preferable, especially in noisy environments, to enhance the SINR of the signal using SINR enhancement unit 1900 to overcome a poor SNR/SINR. The operation of the SINR enhancement unit is described in more detail above with reference to FIGS. 19-24. SINR enhancement unit 1900 achieves signal enhancement, as well as the mitigation of propagation channel effects.

Some of the modern waveforms used by 3G wireless handsets, such as WCDMA, are spectrally spread and scrambled for security purposes. Because of this, the raw signals (I & Q) received by the sensors that are monitoring a given area of interest look more like noise, and the handset-specific features are not easy to extract from them. For this reason, the feature estimation unit 600 is used to despread, unscramble, demodulate, and re-modulate in order to generate an estimate of the actual handset-transmitted I & Q data, which we refer to as the reference signal in this disclosure.

The operation of feature estimation unit 600 is described in more detail above with reference to FIGS. 6-10. Put simply, feature estimation unit 600 first identifies the scrambling code and generates the reference signal. This reference signal, which is devoid of propagation channel effects and interference from other emitters, is then used by feature estimation unit 600 in estimating the features that are used in the specific emitter identification. Again, the feature estimation techniques of feature estimation unit 600 are described in more detail above with reference to FIGS. 6-10. Finally, emitter identifier 2510 is used to classify the input signal as an identified emitter 2502 based on the estimated features. Emitter identifier 2510 is based on Gaussian Mixture Models (GMM) and the Bayesian decision engine. One technique for signal classification is described above with reference to FIGS. 1 and 3. Emitters may be classified at different levels of granularity depending on the SINR environment and the effectiveness of SINR enhancement. For example, at one level of granularity, the SEI techniques described above may be able to differentiate one brand and model of mobile phone from another brand and model. At a finer level of granularity, in a high SINR environment, the SEI techniques may be able to distinguish between individual handsets of same brand and model.

Figure 26:
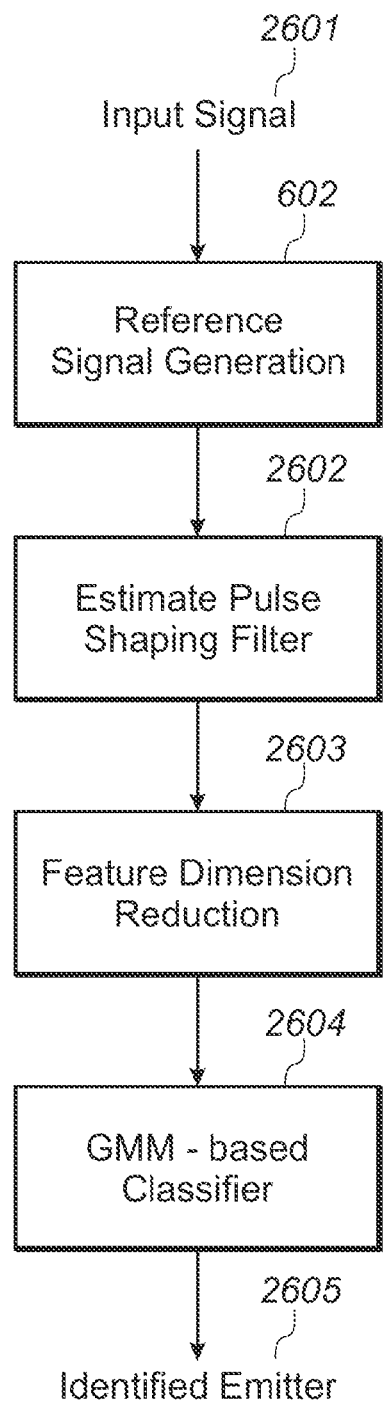
FIG. 26 shows a block diagram of an SEI system according to a preferred embodiment of the disclosure.

FIG. 26 shows a block diagram of a preferred SEI embodiment of the disclosure. As mentioned above, the RF characteristics of signals transmitted from different individual handsets differ due to small variations in the analog electronics of each handset, particularly the analog filtering. The techniques described with reference to FIG. 26 take advantage of this specific type of variation. Initially, input signal 2601 is passed to reference signal generation unit 602 to generate the reference signal. The operation of reference signal generation 602 is described above with reference to FIGS. 6-10.

Next, the pulse shaping filter estimating unit 2602 uses the reference signal to estimate the pulse shaping filter (which is the aggregate of all filtering in a given emitter's transmission chain, including both digital and analog filters) used in a particular emitter. The pulse shaping filter estimating unit 2602 operates as follows. First, the reference signal generated from the reference signal generation unit 602 is designated as x. The measured signal y can then be represented in terms of the reference signal x, the pulse shaping filter h of the emitter hardware from which it was transmitted, and Gaussian noise w, as:

$$y = Xh + w$$

Here, both y and w are vectors of length N, h is a vector of length L, and X is a N×L matrix $$X = \begin{bmatrix} x(-L+1) & x(-L+2) & \ldots & x(0) \\ x(-L+2) & x(-L+3) & \ldots & x(1) \\ & & & \vdots \\ x(N-L) & x(N-L+1) & \ldots & x(N-1) \end{bmatrix}$$

The pulse shaping filter estimating unit 2602 then estimates the optimum filter h from the SINR-enhanced measured data y and the estimated reference signal, using Weiner's solution, which is given by:

$$\hat{h}i = (X^H X)^{-1} X^H y$$

In the above equation we can approximate $(X^H X) \approx NI$. Using this approximation, the above equation reduces to:

$$\hat{h} = \frac{1}{N} X^H y$$

The channel scaling gain is compensated by:

$$\frac{\hat{h}}{h_{ref}^H \hat{h}} = \frac{(X^H X)^{-1} X^H y}{h_{ref}^H (X^H X)^{-1} X^H y} \approx \frac{X^H y}{h_{ref}^H X^H y}$$

The resulting $\hat{h}$ is the set of estimated filter coefficients which are considered as the feature vectors for the purposes of emitter identification.

Next, the estimated filter coefficients are used as the feature vector in the identification/classification. The Feature dimension reduction unit 2603 is configured to reduce the feature dimension by using Linear Discriminant Analysis (LDA). This technique corresponds to eigenvalue-eigenvector decomposition. We keep the M eigenvectors that are associated with the M largest eigenvalues. This technique is helpful because it finds a feature set that is most discriminatory, and it reduces the size of the feature vector that is used in the identification. By reducing the dimensionality of the feature space, we reduce the computational complexity of identification.

Next, the GMM-based classifier 2604 fits a Gaussian Mixture Model (GMM) to the feature vector and applies the Bayes' decision criterion. First, a GMM is applied to the reduced feature vector. For this, the GMM-based classifier 2604 estimates the mean vectors and the covariance matrices for a given number of mixtures. This estimation is achieved through an Expectation-Maximization (EM) algorithm. For the EM algorithm, the inputs are the feature vectors F and the number of mixtures M. The outputs of the EM algorithm are the estimated mean vectors μ of size C and the covariance matrix Σ. The resulting multivariate normal distribution is then given by:

$$p\left(F, \{\mu_i, \sum_i\}\right) = \sqrt{\frac{1}{(2\pi)^C \det(\sum_i)} e^{-\frac{1}{2}(F-\mu_i)^T \Sigma_i^{-1}(F-\mu_i)}}$$

The probability of feature vector F given a classification h is:

$$p(F|h) = \sum_{i=1}^{C} p(F, \{\mu_i, \Sigma_i\})$$

The Bayes' rule to make the classification decision is:

$$p(c|F) = \frac{p(F|c)p(c)}{p(F)}$$

where c is a class and F is the feature vector
Assuming each class is equally likely a priori, and there are N classes then $$p(h) = \frac{1}{N},$$

and p(F) can be approximated as:

$$p(F) = \sum_{i=1}^{N} p(F|h_i) p(h_i)$$

Bayes' decision then corresponds to picking the class with the largest p(c|F).

The various "units" discussed in the block diagrams of FIGS. 25-26 may be implemented in hardware, such as ASICs, FPGAs, DSPs and the like. In addition, each of the "units" may also be implemented as one or more software routines running on a general purpose processor. The "units" are meant to depict specific functionalities, and actual implementations may be tailored for the specific application desired.

Experimental Results

Figure 27:
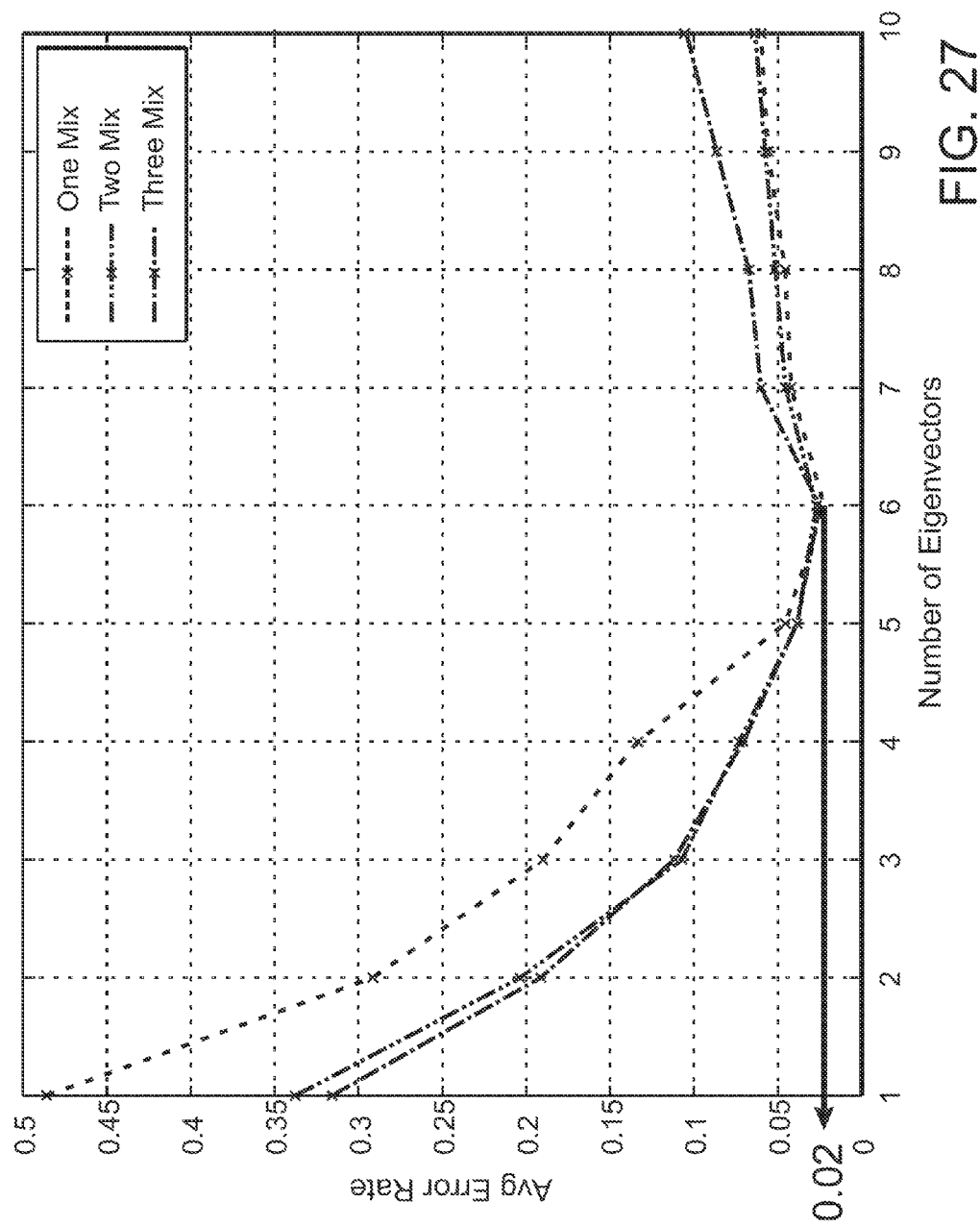
FIG. 27 shows a plot of classification error with respect to different numbers of features.

We tested our apparatus and techniques for SEI on a set of 3G handsets. The handsets that we considered were: five handsets of a first model and brand (A, B, C, D, E), one handset of a second brand (BB), and one handset of a third brand (MR). We collected 78 different sets of RF measurements from them in different transmission modes (voice only, data only and voice and data), at different powers, at different times of the day, and at various temperatures in the laboratory using a radio network analyzer as a sensor. We considered half of the data for training and other half for testing. The halves were selected randomly so as to include representative samples in both training and testing. While training, we analyzed the data, estimated pulse shaping filters, applied the LDA to reduce the feature vector dimension, and created GMMs. While testing, we analyzed the data, estimated pulse shaping filters, applied the LDA to reduce the feature vector dimension, and used the Bayes' decision rule to identify the class (corresponding to a specific emitter) that the feature vector most likely belongs to. We also experimented with different numbers of feature dimensions and different numbers of Gaussian mixtures. We varied the number of mixtures from one to three and the feature dimensions from one to ten and evaluated the performance of SEI. In FIG. 27, the classification error is plotted with respect to different number of features. Different plot lines correspond to different number of mixtures. From this figure it can be seen that we obtained an average error rate of 2% for three mixtures and a feature dimension of 6. FIG. 28 shows a table of SEI accuracy in the form of a confusion matrix for a feature vector dimension of six and three Gaussian mixtures. From this table, it can be seen that handset A was confused with handset D twice and with handset E once, and handsets D and E were confused with each other once. However, there was no confusion between any handsets of different brands. This suggests that our algorithm can accurately identify the manufacturer of a 3G handset with even higher confidence.

What is claimed is:

1. An apparatus for identifying a specific emitter in the presence of noise and/or interference, the apparatus comprising:
   a sensor configured to receive a portion of a radio frequency band and produce complex data, the complex data containing noise and one or more observations of a transmitted signal from at least one emitter including a particular emitter to be identified;
   a reference estimation unit configured to estimate a reference signal relating to the signal transmitted by the particular emitter;
   one or more feature estimation units configured to generate one or more feature estimates from the reference signal and the signal transmitted by the particular emitter; and
   an emitter identifier configured to identify the signal transmitted by the particular emitter as originating from a specific device using one or more feature estimates.

2. The apparatus of claim 1 further comprising:
   an SINR enhancement unit configured to enhance the SINRs of one or more unknown signals in the complex data before the reference estimation unit estimates the reference signal.

3. The apparatus of claim 2, wherein the SINR enhancement unit comprises:
   an SINR improvement unit configured to receive the complex data, wherein the complex data contains one or more observations of one or more unknown signals, the SINR improvement unit configured to improve the SINRs of one or more unknown signals in the complex data;
   a reference signal generator configured to identify an interfering signal from the complex data and generate a reference signal corresponding to the identified interfering signal, wherein the reference signal generator receives the SINR-improved complex data from the SINR improvement unit; and
   a subtraction unit configured to subtract the reference signal corresponding to the identified interfering signal from the complex data.

4. The apparatus of claim 1, wherein the reference estimation unit comprises:
   a code search unit configured to identify the scrambling code for the signal transmitted by the particular emitter;
   a demodulation unit configured to demodulate the signal transmitted by the particular emitter using the identified scrambling code; and
   a remodulation unit configured to remodulate the demodulated signal transmitted by the particular emitter using the scrambling code in order to create the reference signal.

5. The apparatus of claim 4, wherein the reference signal is substantially free of noise and interference.

6. The apparatus of claim 4, wherein at least one of the one or more feature estimation units further comprises:
   an input operations unit configured to perform linear operations, non-linear operations, or both linear operations and non-linear operations on the spectral data;
   a reference operations unit configured to perform linear operations, non-linear operations, or both linear operations and non-linear operations on the reference signal;
   a correlation unit configured to correlate the output of the input operations unit and the reference operations unit; and
   an output operations unit configured to perform linear operations, non-linear operations, or both linear operations and non-linear operations on the output of the correlation unit in order to generate at least one of the one or more feature estimates.

7. The apparatus of claim 6, wherein at least one of the one or more feature estimation units further comprises:
   one or more feature integration units configured to integrate, for each feature, one or more estimates of the feature and weight the one or more estimates of the feature with corresponding estimated SINRs of the observations from which the estimates were generated in order to generate an integrated feature estimate for that feature.

8. The apparatus of claim 1 wherein the emitter identifier identifies the signal transmitted by the particular emitter as belonging to a specific device using Gaussian Mixture Models and a Bayesian decision engine.

* * * * *